United States Patent [19]

Baker et al.

[11] Patent Number: 5,558,698
[45] Date of Patent: Sep. 24, 1996

[54] ACID GAS FRACTIONATION PROCESS

[75] Inventors: Richard W. Baker, Palo Alto; Kaaeid A. Lokhandwala, Menlo Park, both of Calif.

[73] Assignee: Membrane Technology and Research, Inc., Menlo Park, Calif.

[21] Appl. No.: 410,676

[22] Filed: Mar. 27, 1995

Related U.S. Application Data

[63] Continuation-in-part of Ser. No. 143,283, Oct. 25, 1993, Pat. No. 5,401,300, Ser. No. 143,285, Oct. 25, 1993, Pat. No. 5,407,466, and Ser. No. 143,496, Oct. 25, 1993, Pat. No. 5,407,467.

[51] Int. Cl.[6] .......................... B01D 53/22; B01D 53/14
[52] U.S. Cl. .................. 95/49; 95/51; 423/229; 423/232
[58] Field of Search ...................... 95/45, 49, 51; 423/228, 229, 232, 511, 522

[56] References Cited

U.S. PATENT DOCUMENTS

| | | | |
|---|---|---|---|
| 3,534,528 | 10/1970 | Porter | 55/16 |
| 3,911,080 | 10/1975 | Mehl et al. | 95/45 X |
| 4,117,079 | 9/1978 | Bellows | 95/51 X |
| 4,130,403 | 12/1978 | Cooley et al. | 55/16 |
| 4,147,754 | 4/1979 | Ward, III | 423/229 X |
| 4,370,150 | 1/1983 | Fenstermaker | 55/16 |
| 4,374,657 | 2/1983 | Schendel et al. | 62/19 |
| 4,466,946 | 8/1984 | Goddin, Jr. et al. | 423/229 X |
| 4,493,716 | 1/1985 | Swick | 55/158 |
| 4,561,864 | 12/1985 | Klass et al. | 55/16 |
| 4,589,896 | 5/1986 | Chen et al. | 62/28 |
| 4,597,777 | 7/1986 | Graham | 55/16 |
| 4,606,740 | 8/1986 | Kulprathipanja | 55/16 |
| 4,608,060 | 8/1986 | Kulprathipanja | 55/16 |
| 4,659,343 | 4/1987 | Kelly | 55/16 |
| 4,737,166 | 4/1988 | Matson | 55/16 |
| 4,750,918 | 6/1988 | Sirkar | 423/229 X |
| 4,781,733 | 11/1988 | Babcock et al. | 55/16 |
| 4,824,443 | 4/1989 | Matson et al. | 423/229 X |
| 4,857,078 | 8/1989 | Walter | 55/16 |
| 4,963,165 | 10/1990 | Blume et al. | 55/16 |
| 5,096,592 | 3/1992 | Schucker | 210/654 |
| 5,281,254 | 1/1994 | Birbara et al. | 95/51 X |
| 5,306,476 | 4/1994 | Jalan et al. | 95/45 X |
| 5,326,385 | 7/1994 | Rajani et al. | 423/228 X |
| 5,332,424 | 7/1994 | Rao et al. | 95/49 X |
| 5,401,300 | 3/1995 | Lokhandwala et al. | 95/49 |
| 5,407,466 | 4/1995 | Lokhandwala et al. | 95/49 |
| 5,407,467 | 4/1995 | Lokhandwala et al. | 95/49 |

FOREIGN PATENT DOCUMENTS 1478083  6/1977  United Kingdom .

OTHER PUBLICATIONS

W. J. Schell et al., "Separation of Co2 from Mixtures by Membrane Permeation", Gas Cond. Conf, Univ of Oklahoma, Mar. 1983.

W. J. Schell et al., "Spiral–Wound Permeators for Purification and Recovery", Chem Eng. Progress, Oct. 1982, pp. 33–37.

N. N.–Li et al., "Membrane Sparation Process in the Petrochemical Industry", Phase II Report Dept of Energy, Sep. 1987, pp. 1–12, 17–22.

(List continued on next page.)

*Primary Examiner*—Robert Spitzer
*Attorney, Agent, or Firm*—J. Farrant

[57] ABSTRACT

Improved processes for treating gas streams containing hydrogen sulfide and carbon dioxide, particularly natural gas streams. The processes rely on the availability of a membrane that maintains high hydrogen sulfide/methane selectivity and adequate hydrogen sulfide/carbon dioxide selectivity when measured with multicomponent gas mixtures at high pressure. The processes have three steps: an acid gas removal step, to remove both hydrogen sulfide and carbon dioxide from the primary gas stream; a membrane fractionation step, to separate hydrogen sulfide from carbon dioxide and create a highly hydrogen-sulfide-concentrated fraction; and a sulfur-fixing step.

35 Claims, 12 Drawing Sheets

OTHER PUBLICATIONS

E. W. Funk et al., "Effect of Impurities on Cellulose Acetate Membrane Performance", Recent Adv. in Separation Tech. AIChE Symposium Series, 250, vol. 82, 1986.

A. B Coady et al., "CO2 Recovery by Gas permeation", Chem Eng. Progress Oct. 1982, pp. 44–49.

F. G. Russell, "Applications of the DELSEP Membrane System", Chem Engineering Progress, Oct. 1984, pp. 48–52.

D. Parro, "Membrane CO2 Separation", Energy Progress, vol. 5, No. 1, Mar. 1985, pp. 51–54.

G. Cutler et al., "Large Scale CO2 Recovery with Membranes", Gas Cond. Conference, 1985.

T. E. Cooley et al., "Field Tests Show Membrane Processing Attractive" Chem. Engineering Progress, Oct. 1985, pp. 45–50.

G. Markiewicz, "Separex Membrane Systems: The Economical Solution to Gas Treating Problems", Gas Processor's Assoc Mtg, Jan. 1988.

D. J. Stookey et al., "Natural Gas Processing with PRISM Separators", Environmental Progress, vol. 3, No. 3, Aug. 1984, pp. 212–214.

W. H. Mazur et al., "Membranes for Natural Gas Sweetening CO2 Enrichment", Chem Eng. Progress, Oct. 1982, pp. 38–43.

M. D. Donahue et al., "Permeation behavior of carbon dioxide–methane Mixtures in cellulose acetate membranes", Journal Membrane Science No. 42, 1989 pp. 197–214.

A. Deschamps et al., "Development of Gaseous Permeation Membranes adapted to the Purification of Hydrocarbons", IIF–IIR Comm A3, Paris, 1989.

D. L. Ellig et al., "Concentration of Methane from Mixtures with Carbon Dioxide by Permeation through Polymeric Films", Journal of Membrane Science, 6, 1980 pp. 259–263.

B. D. Bhide et al., "Membrane processes for the removal of acid gases from natural gas. Process configurations and optimization of operating conditions." Journal Memb. Science, 81, 1993 pp. 209–237.

B. D. Bhide et al., "Membrane processes for the removal of acid gases from natural gas. Effects of operating conditions, economic parameters and membrane properties" Journal Memb Sc., 81, 1993, pp. 239–252.

H. E. Johnson et al., "Assessment of the Potential for Refinery Applications of Inorganic Membrane Technology" Final Report to Dept of Energy, May, 1993, pp. 2–1, 5–9, 5–10, 5–12, appx. B, p. 7.

ACID GAS FRACTIONATION PROCESS

This application is a continuation-in-part of U.S. patent application Ser. Nos. 08/143,283, 143,285 and 143,496, each filed on Oct. 25, 1993, now U.S. Pat. Nos. 5,401,300, 5,407,466, and 5,407,467, respectively, the contents of which are incorporated herein by reference in their entireties.

FIELD OF THE INVENTION

The invention relates to processes for removing acid gases from gas streams. More particularly, the invention relates to a membrane process, and to combinations of membrane and non-membrane processes, for removing hydrogen sulfide and carbon dioxide from gas streams, such as natural gas.

BACKGROUND OF THE INVENTION

Natural gas provides more than one-fifth of all the primary energy used in the United States. Much raw gas is "subquality", that is, it exceeds the pipeline specifications in nitrogen, carbon dioxide and/or hydrogen sulfide content. A representative range of U.S. gas compositions, compared to the specifications that must be met to bring the gas to pipeline quality, is shown in Table 1.

TABLE 1

Natural Gas Compositions Found in the U.S. and the Specifications of the Pipeline Grid

| Component | Typical pipeline spec. | Typical composition range |
|---|---|---|
| Hydrogen sulfide | <4 ppm | **76% < 4 ppm<br>11% 4–1,000 ppm<br>4% 1,000–10,000 ppm<br>8% > 10,000 ppm |
| Carbon dioxide | <1–3% | **72% < 1%<br>18% 1–3%<br>7% 3–10%<br>3% > 10% |
| Water | 80–140 ppm | 800–1,200 ppm |
| Inerts ($CO_2$, $N_2$, He, Ar, etc.) | <3–4% | — |
| Oxygen | <0.4% | — |

**Compositions for producing wells. Unexploited reserves contain higher fractions of subquality gas.

The best treatment for natural gas right now is no treatment. Currently, more than half of the gas produced in the U.S. can be brought to pipeline specification after minimal processing, such as glycol dehydration to remove water. Raw gas that is known to be high in nitrogen content, high in nitrogen plus carbon dioxide content, or high in hydrogen sulfide content is usually left in the ground, because it cannot be extracted and treated economically with present processing technology.

There are several aspects to the problem of treating natural gas to bring it to pipeline specifications. The first is the removal of impurities, primarily water, hydrogen sulfide and carbon dioxide; the second is loss of methane during processing. Processes that remove hydrogen sulfide and carbon dioxide may also remove a portion of the methane. Losses of less than about 3% are normally acceptable; losses of 3–10% may be acceptable if offset by other advantages; losses above 10% are normally unacceptable. A third aspect is the fate of the impurities once removed. Carbon dioxide can be discharged or reinjected, but hydrogen sulfide, which is toxic even in low concentrations, must be treated. If the waste stream containing hydrogen sulfide can be concentrated sufficiently, it may be passed to a Claus plant for conversion to sulfur. Waste streams containing low concentrations must be disposed of in some other way, such as a redox process of the LO CAT or Stretford type, for example, or, less desirably, flaring.

Choice of appropriate treatment is, therefore, not straightforward, and depends on the feed gas composition, the size and location of the plant and other variables.

When natural gas is treated, most plants handling large volumes of sour gas containing greater than about 200 ppm hydrogen sulfide use amine-based technology for acid gas removal. Amines commonly used include MEA, DEA, DIPA, DGA and MDEA. The plants can remove both carbon dioxide and hydrogen sulfide. When the amine solution is spent, the acid gases are flashed off and the solution is regenerated. The mechanical equipment in an amine plant makes it susceptible to failure. The plant includes heaters, aerial coolers, pumps, etc. and requires frequent quality checks and maintenance, making operational reliability probably the weakest feature of the technology.

Amine plants do not sorb methane to any significant extent, so methane loss is not an issue in this case. However, the hydrogen-sulfide-containing gas stream produced when the sorbent is regenerated must still be treated, subject to the same constraints as above.

As an alternative to amine sorption, or as a polishing step following any process, specialized scavenging or sulfur recovery processes, such as Sulfa-Scrub, Sulfa-Check, Chemsweet, Supertron 600, solid iron sponge or solid zinc oxide may be used for low-volume streams containing less than about 100 ppm hydrogen sulfide. Many scavengers present substantial disposal problems, however. In an increasing number of states, the spent scavenger constitutes toxic waste.

A considerable body of literature exists regarding membrane-based treatment of natural gas, mostly using cellulose acetate (CA) membranes to remove carbon dioxide. Membrane technology is attractive for this separation, because treatment can be accomplished using the high wellhead gas pressure as the driving force for the separation. Membrane systems, have, however, been slow to penetrate the market, and it is estimated that no more than about 1% of all processing is carried out using membranes. Nevertheless, for small-scale streams of appropriate composition, cellulose acetate membrane plants are state-of-the art, and up to 100 of these are believed to have been installed. Although all of these plants are designed to remove carbon dioxide, cellulose acetate membranes also have selectivity for hydrogen sulfide over methane, so they tend to coextract small amounts of hydrogen sulfide. Unless the raw gas stream contains very high concentrations of carbon dioxide, however, it is not possible to reduce a stream containing even modest amounts of hydrogen sulfide to pipeline specification (usually 4 ppm hydrogen sulfide) without vastly overprocessing as far as the carbon dioxide specification is concerned. If such overprocessing is performed, large amounts of methane are lost in the membrane permeate stream, and this is normally unacceptable.

Only a few of the many literature references relating to membrane-based carbon dioxide treatment specifically discuss removal of hydrogen sulfide in conjunction with the carbon dioxide. A paper by W. J. Schell et al. ("Separation of $CO_2$ from Mixtures by Membrane Permeation", presented at the Gas Conditioning Conference, University of Oklahoma, March 1983) says that "If the $H_2S$ level is low enough, the membrane system can also be used to meet pipeline specification for this component without any further treatment required." The paper shows a case where a cellulose acetate membrane system can be used to reach pipeline specification for carbon dioxide and hydrogen sulfide in two stages, starting with a feed content of 15% carbon dioxide and 250 ppm hydrogen sulfide, and points out that, for high concentrations of hydrogen sulfide, "a much larger number of elements are required to reduce the $H_2S$ levels to pipeline specification (¼ grain) than for $CO_2$ (3%)." The costs of membrane treatment are estimated to be more than 100% higher than conventional amine treatment in this case.

A report by N. N. Li et al. to the Department of Energy ("Membrane Separation Processes in the Petrochemical Industry", Phase II Final Report, September 1987) examined the effect of impurities, including hydrogen sulfide, on the ability of cellulose acetate membranes to remove carbon dioxide from natural gas. The reporters found that the membrane performance was not affected significantly by hydrogen sulfide alone. However, dramatic loss of membrane permeability was observed if both hydrogen sulfide and water vapor were present in the feed. The authors concluded that "successful use of these CA-based membranes must avoid processing gas which simultaneously has high $H_2O$ and $H_2S$ concentrations".

Another problem associated with cellulose acetate membranes is water, which is always present in raw natural gas streams to some extent, as vapor, entrained liquid, or both. The gas separation properties of cellulose acetate membranes are destroyed by contact with liquid water, so it is normally necessary to provide pretreatment to knock out any liquid water and to reduce the relative humidity low enough that there is no risk of condensation of water within the membrane modules on the permeate side. For example, the above-cited paper by W. J. Schell et al. ("Separation of $CO_2$ from Mixtures by Membrane Permeation", presented at the Gas Conditioning Conference, University of Oklahoma, March 1983) points out that "Even though membrane systems simultaneously dehydrate while removing $CO_2$, care must be taken to avoid contacting the membrane with liquid water. Feed gas streams saturated with water are normally preheated to at least 10° above the water dew point at the feed inlet pressure and the pressure tubes and inlet piping are insulated to prevent condensation."

The above-cited report by N. N. Li et al. ("Membrane Separation Processes in the Petrochemical Industry. Phase II Final Report, September 1987) presents data showing the effect of water vapor on membrane flux for cellulose acetate membranes, and concludes that "for relative humidities of 30% and higher, the flux decline is large, rapid, and irreversible". E. W. Funk et al. ("Effect of Impurities on Cellulose Acetate Membrane Performance", Recent Advances in Separation Techniques—III, AIChE Symposium Series, 250, Vol 82, 1986) advocate that "Moisture levels up to 20% RH appear tolerable but higher levels can cause irreversible membrane compaction".

U.S. Pat. No. 4,130,403 to T. E. Cooley et al. (Removal of $H_2S$ and/or $CO_2$ from a Light Hydrocarbon Stream by Use of Gas Permeable Membrane, 1978, Col. 12, lines 36-39) states that "It has been discovered that in order to function effectively, the feed gas to the cellulose ester membrane should be substantially water free". A second paper by W. J. Schell et al. (Spiral-Wound Permeators for Purification and Recovery", Chemical Engineering Progress, October 1982, pages 33-37) confirms that "Liquid water is detrimental to the performance of the membrane, however, so that the feed gas is delivered to the membrane system at less than 90% relative humidity."

In other words, although cellulose acetate membranes will permeate water preferentially over methane, and hence have the capability to dehydrate the gas stream, care must be taken to keep the amounts of water vapor being processed low, and, according to some teachings, as low as 20-30% relative humidity.

In light of these limitations, considerable effort has been expended over the last few years in the search for membrane materials that would be better able to handle streams containing carbon dioxide plus secondary contaminants, notably hydrogen sulfide and water.

A measure of the ability of a membrane to separate two gases, A and B, is the ratio of their permeabilities, α, called the membrane selectivity, $$\alpha_{A/B} = \frac{P_{(A)}}{P_{(B)}}$$

This can also be written as $$\alpha_{A/B} = \left[\frac{D_A}{D_B}\right]\left[\frac{k_A}{k_B}\right]$$

The ratio $D_A/D_B$ is the ratio of the diffusion coefficients of the two gases and can be viewed as the mobility selectivity, reflecting the different sizes of the two molecules. The ratio $k_A/k_B$ is the ratio of the Henry's law solubility coefficients of the two gases and can be viewed as the solubility selectivity, reflecting the relative condensabilities of the two gases.

In all polymer materials, the diffusion coefficient decreases with increasing molecular size, because large molecules interact with more segments of the polymer chain than small molecules. Hence, the mobility coefficient always favors the passage of small molecules over large ones. The sorption coefficient, on the other hand, is a measure of the energy required for the permeant to be sorbed by the polymer and increases with the condensability of the permeant. This dependence on condensability means that the sorption coefficient increases with molecular diameter, because large molecules are normally more condensable than smaller ones. The combined effect of these two factors determines the selectivity of the membrane.

The balance between mobility selectivity and sorption selectivity is different for glassy and rubbery polymers. In glassy polymers, the mobility term is usually dominant, permeability falls with increasing permeant size and small molecules permeate preferentially. In rubbery polymers, the sorption term is usually dominant, permeability increases with increasing permeant size and larger molecules permeate preferentially. Since both carbon dioxide (3.3 Å) and hydrogen sulfide (3.6 Å) have smaller kinetic diameters than methane (3.8 Å), and since both carbon dioxide and hydrogen sulfide are more condensable than methane, both glassy and rubbery membranes are selective for the acid gas components over methane. To date, however, most membrane development work in this area has focused on glassy materials, of which cellulose acetate is the most successful example.

In citing selectivity, it is important to be clear as to how the permeation data being used have been measured. It is common to measure the fluxes of different gases separately, then to calculate selectivity as the ratio of the pure gas permeabilities. This gives the "ideal" selectivity for that pair of gases. Pure gas measurements are more commonly reported than mixed gas experiments, because pure gas experiments are much easier to perform. Measuring the permeation data using gas mixtures, then calculating the selectivity as the ratio of the gas fluxes, gives the actual selectivity that can be achieved under real conditions. In gas mixtures that contain condensable components, it is frequently, although not always, the case that the mixed gas selectivity is lower, and at times considerably lower, than the ideal selectivity. The condensable component, which is readily sorbed into the polymer matrix, swells or, in the case of a glassy polymer, plasticizes the membrane, thereby reducing its discriminating capabilities.

A technique for predicting mixed gas performance under real conditions from pure gas measurements with any reliability has not yet been developed. In the case of gas mixtures such as carbon dioxide/methane with other components, the expectation is that the carbon dioxide at least will have a swelling or plasticizing effect, thereby changing the membrane permeation characteristics. This expectation is borne out by cellulose acetate membranes. For example, according to a paper by M. D. Donahue et al. ("Permeation behavior of carbon dioxide-methane mixtures in cellulose acetate membranes", Journal of Membrane Science, 42, 197–214 1989) when measured with pure gases, the carbon dioxide permeability of asymmetric cellulose acetate is $9.8\times10^{-5}$ $cm^3/cm^2 \cdot s \cdot kPa$ and the methane permeability is $2.0\times10^{-6}$ $cm^3/cm^2 \cdot s \cdot kPa$, giving an ideal selectivity of about 50. Yet the actual selectivity obtained with mixed gases is typically in the range 10–20, a factor of 3–5 times lower than the ideal selectivity. For example, the report to DOE by Norman Li et at., discussed above, gives carbon dioxide/methane selectivities in the range 9–15 for one set of field trials (at 870–905 psi feed pressure) and 12 for another set (at 200 psig feed pressure) with a highly acid feed gas. The W. J. Schell et al. Chemical Engineering Progress paper, discussed above, gives carbon dioxide/methane selectivities of 21 (at 250–450 psig feed pressure) and 23 (at 800 psig feed pressure). Thus, even in mixed gas measurements, a wide spread of selectivities is obtained, the spread depending partly on operating conditions. In particular, the plasticizing or swelling effect of the carbon dioxide on the membrane tends to show pressure dependence, although it is sometimes hard to distinguish this from other effects, such as the contribution of secondary condensable components.

As a first step in developing a new membrane, it is normal to start by testing with pure gases under mild operating conditions. Membranes that appear to pass this test can then be developed and tested further, modified, optimized and scaled up, leading eventually to field tests, full-scale demonstration and ultimately, industrial acceptance. Candidate membranes can and do fall by the wayside at each step along this path, for diverse reasons.

The search for improved membranes for removing acid components from gas streams, although it has focused primarily on glassy membranes, encompasses several types of membranes and membrane materials. A paper by A. Deschamps et al. ("Development of Gaseous Permeation Membranes adapted to the Purification of Hydrocarbons", I.I.F—I.I.R—Commission A3, Paris, 1989) describes work with aromatic polyimides having an intrinsic material selectivity of 80 for carbon dioxide over methane and 200,000 for water vapor over methane. The paper defines the target selectivities that the researchers were aiming for as 50 for carbon dioxide/methane and 200 for water vapor/methane. The paper, which is principally directed to dehydration, does not give carbon dioxide/methane selectivities, except to say that they were "generally low", even though the experiments were carried out with pure gas samples. In other words, despite the high intrinsic selectivity of 80, the lower target value of 50 could not be reached.

British patent number 1,478,083, to Klass and Landahl, presents a large body of permeation data obtained with methane/carbon dioxide/hydrogen sulfide mixed gas streams and polyamide (nylon 6 and nylon 6/6), polyvinyl alcohol (PVA), polyacrylonitrile (PAN) and gelatin membranes. Some unexpectedly high selectivities are shown. For the nylon membranes, carbon dioxide/methane selectivities of up to 30, and hydrogen sulfide/methane selectivities up to 60, are reported. The best carbon dioxide/methane selectivity is 160, for PAN at a temperature of 30° C. and a feed pressure of 65 psia; the best hydrogen sulfide/methane selectivity is 200, for gelatin at the same conditions. In both cases, however, the permeability is extremely low: for carbon dioxide through PAN, less than $5\times10^{-4}$ Barrer and for hydrogen sulfide through gelatin, less than $3\times10^{-3}$ Barrer. These low permeabilities would make the transmembrane fluxes miserable for any practical purposes. It is also unknown whether the gelatin membrane, which was plasticized with glycerin, would be stable much above the modest pressures under which it was tested.

U.S. Pat. No. 4,561,864, also to Klass and Landahl, incorporates in its text some of the data reported in the British patent discussed above. The '864 patent also includes a table of calculations for cellulose acetate membranes, showing the relationship between "Figure of Merit", a quantity used to express the purity and methane recovery in the residue stream, as a function of "Flow Rate Factor", a quantity that appears to be somewhat akin to stage-cut. In performing the calculations, separation factors (where the separation factor is the sum of the carbon dioxide/methane selectivity and the hydrogen sulfide/methane selectivity) of 20 to 120 are assumed. The figures used in the calculations appear to range from the low end of the combined carbon dioxide and hydrogen sulfide selectivities from mixed gas data to the high end of the combined selectivities calculated from pure gas data.

A paper by D. L. Ellig et al. ("Concentration of Methane from Mixtures with Carbon Dioxide by permeation through Polymeric Films", Journal of Membrane Science, 6, 259–263, 1980) summarizes permeation tests carried out with 12 different commercially available films and membranes, using a mixed gas feed containing 60% carbon dioxide, 40% methane, but no hydrogen sulfide or water vapor. The tests were carried out at 2,068 kPa (about 300 psi) feed pressure. The results show selectivities of about 9–27 for cellulose acetate, up to 40 for polyethersulfone and 20–30 for polysulfone. One of the membranes tested was nylon, which, in contradiction to the results reported by Klass and Landahl, showed essentially no selectivity at all for carbon dioxide over methane.

The already much-discussed DOE Final Report by N. N. Li et al. contains a section in which separation of polar gases from non-polar gases by means of a mixed-matrix, facilitated transport membrane is discussed. The membrane consists of a silicone rubber matrix carrying polyethylene glycol, which is used to facilitate transport of polar gases, such as hydrogen sulfide, over non-polar gases, such as methane. In tests on natural gas streams, the membranes exhibited hydrogen sulfide/methane selectivity of 25–30 and carbon dioxide/methane selectivity of 7–8, which latter number was considered too low for practical carbon dioxide separation. The membrane was also shown to be physically unstable at feed pressure above about 170 psig, which, even if the carbon dioxide/methane selectivity were adequate, would render it unsuitable for handling raw natural gas streams. U.S. Pat. Nos. 4,608,060, to S. Kulprathipanja, and 4,606,740, to S. Kulprathipanja and S. S. Kulkarni, of Li's group at UOP, present additional data using the same type of glycol-laden membranes as discussed in the DOE report. In this case, however, pure gas tests were performed and ideal hydrogen sulfide/methane selectivities as high as 115–185 are quoted. It is interesting to note that these are 4–8 times higher than the later measured mixed gas numbers quoted in the DOE report. The same effect obtains for carbon dioxide, where the pure gas selectivities are in the range 21–32 and the mixed gas data give selectivities of 7–8.

U.S. Pat. No. 4,781,733, to W. C. Babcock et al., describes results obtained with an interfacial composite membrane made by a polycondensation reaction between a diacid-chloride-terminated silicone rubber and a diamine. In pure gas experiments at 100 psig, the membrane exhibited hydrogen sulfide/methane selectivities up to 47 and carbon dioxide/methane selectivities up to 50. No mixed gas or high-pressure data are given.

U.S. Pat. No. 4,493,716, to R. H. Swick, reports permeation results obtained with a composite membrane consisting of a polysulfide polymer on a Goretex (polytetrafluoro-ethylene) support. Only pure gas, low-pressure test cell permeability data are given. Based on the reported permeabilities, which only give an upper limit for the methane permeability, the membrane appears to have a hydrogen sulfide/methane selectivity of at least 19–42 and a carbon dioxide/methane selectivity of at least 2–6. Some results show that the carbon dioxide permeability increased after exposure to hydrogen sulfide, which might suggest an overall decrease in selectivity if the membrane has become generally more permeable, although no methane data that could confirm or refute this are cited.

U.S. Pat. No. 4,963,165, to I. Blume and I. Pinnau reports pure gas, low-pressure data for a composite membrane consisting of a polyamide-polyether block copolymer on a polyamide support. Hydrogen sulfide/methane selectivities in the range 140–190, and carbon dioxide/methane selectivities in the range 18–20, are quoted. Mixed gas data for a stream containing oxygen, nitrogen, carbon dioxide and sulfur dioxide are also quoted and discussed in the text, but it is not clear how these data would compare with those for methane- or hydrogen-sulfide-containing mixed gas streams.

Despite the many and varied research and development efforts that this body of literature represents, cellulose acetate membranes, with their attendant advantages and disadvantages, remain the only membrane type whose properties in handling acid gas streams under real gas-field operating conditions are reasonably well understood, and the only membrane type in commercial use for removing acid gas components from methane.

U.S. Pat. No. 4,589,896, to M. Chen et al., exemplifies the type of process that must be adopted to remove carbon dioxide and hydrogen sulfide from methane and other hydrocarbons when working within the performance limitations of cellulose acetate membranes. The process is directed at natural gas streams with a high acid gas content, or at streams from enhanced oil recovery (EOR) operations, and consists of a multistage membrane separation, followed by fractionation of the acid gas components and multistage flashing to recover the hydrogen sulfide. The acid-gas-depleted residue stream is also subjected to further treatment to recover hydrocarbons. The raw gas to be treated typically contains as much as 80% or more carbon dioxide, with hydrogen sulfide at the relatively low, few thousands of ppm level. Despite the fact that the ratio of the carbon dioxide content to the hydrogen sulfide content is high (about 400:1), the raw gas stream must be passed through a minimum of four membrane stages, arranged in a three-step, two-stage configuration, to achieve good hydrogen sulfide removal. The goal is not to bring the raw gas stream to natural gas pipeline specification, but rather to recover relatively pure carbon dioxide, free from hydrogen sulfide, for further use in EOR. The target concentration of carbon dioxide in the treated hydrocarbon stream is less than 10%, which would, of course, not meet natural gas pipeline standards. The methane left in the residue stream after higher hydrocarbon removal is simply used to strip carbon dioxide from hydrogen-sulfide-rich solvent in a later part of the separation process; no methane passes to a natural gas pipeline. Despite the multistep/multistage membrane arrangement, in a representative example, about 7% carbon dioxide is left in the hydrocarbon residue stream after processing, and about 12% hydrocarbon loss into the permeate takes place.

It is common to combine treatment by membranes with treatment by non-membrane processes. As a few sample references, the DOE Final Report by N. N. Li et al., FIG. 1, shows such a membrane system upstream of an absorption unit and a Claus plant. The W. J. Schell et al. paper presented at the Gas Conditioning Conference, FIG. 6, shows conventional treatment, such as amine absorption, of the membrane residue stream. A paper by D. J. Stookey et al. ("Natural Gas Processing with PRISM® Separators", Environmental Progress, August 1984, Vol 3, No. 3, pages 212–214) shows various figures in which membrane separation is combined with non-membrane treatment processes. A paper by W. H. Mazur et al. ("Membranes for Natural Gas Sweetening and $CO_2$ Enrichment", Chemical Engineering Progress, October 1982, pages 38–43) shows several membrane/non-membrane treatment schemes.

The separation of hydrogen sulfide from carbon dioxide is addressed in U.S. Pat. No. 4,737,166, to S. L. Matson et al., which discloses an immobilized liquid membrane typically containing n-methylpyrrolidone or another polar solvent in cellulose acetate or any other compatible polymer. The membranes and processes discussed in this patent are directed to selective hydrogen sulfide removal, in other words leaving both the methane and the carbon dioxide behind in the residue stream. As in the UOP patents, very high hydrogen sulfide/methane selectivities, in the range 90–350, are quoted. Only pure gas data are given, however, and the feed pressure is 100 psig. The material responsible for the separation properties is the liquid solvent immobilized in the support membrane. There is no discussion as to how this liquid membrane might behave when exposed to multicomponent gas streams and/or feed pressures any higher than 100 psig. Based on the UOP teachings, the mixed gas, high-pressure results might be expected to be not so good.

A report by SFA Pacific to the Department of Energy ("Assessment of the Potential for Refinery Applications of Inorganic Membrane Technology—An Identification and Screening Analysis", Final Report, May 1993) advocates research into whether inorganic membranes could be used in separating hydrogen sulfide from carbon dioxide as an intermediate step between bulk acid gas removal and sulfur fixation in synthesis gas production. The report indicates that no applications of organic membranes have been made for this separation, and further indicates that organic membranes have problems in separating refinery gas streams, because they are often damaged by entrained hydrocarbon liquids. The report then states that "researchers are developing advanced small-pore-sized inorganic membranes which may substantially increase the efficiency and economics of separation processes for selected refining applications.

Expected advantages of the advanced inorganic membranes are high permeability (1,000 to 10,000 times organic membrane permeability ), high selectivity, and a low-cost, simple, versatile manufacturing process". It goes on to suggest a design for integrating an intermediate membrane-separation step into the acid gas removal and treatment process train, should the expected inorganic membranes with suitable, but unspecified, separation properties become available.

In summary, it may be seen that there remains a need for improved membranes and improved processes for handling streams containing methane, acid gas components and water vapor. Such improved membrane processes could, in turn, be combined with non-membrane treatment techniques to provide improved "hybrid" processes.

SUMMARY OF THE INVENTION

The invention provides improved processes for treating gas streams containing hydrogen sulfide, carbon dioxide, and optionally water vapor and methane, particularly natural gas streams.

An important aspect of the invention is the availability of polymer membranes with much higher mixed gas, actual hydrogen sulfide/carbon dioxide selectivities than cellulose acetate or any of the other membranes used for acid gas separations to date.

Another important aspect of the invention in the current application is that a membrane separation process is combined with one or more non-membrane processes, to provide a treatment scheme that can, if desired, deliver pipeline quality methane, on the one hand, and that concentrates and disposes of the acid-gas-laden waste stream, in an efficient and environmentally acceptable manner, on the other.

The process of the current invention has three steps:
1. An acid gas removal step, to remove both hydrogen sulfide and carbon dioxide from the primary gas stream;
2. A membrane fractionation step, to separate hydrogen sulfide from carbon dioxide;
3. A sulfur-fixing step.

The process is shown in schematic form in FIG. 1 (described fully in the Detailed Description of the Invention below), wherein stream 101 represents the primary gas stream, box 100 represents the first acid gas removal step, box 104 represents the membrane fractionation step and box 107 represents the sulfur-fixing step.

FIRST STEP

The first step, removal of both hydrogen sulfide and carbon dioxide from the primary gas stream, can be carried out by a non-membrane or a membrane operation. Representative preferred non-membrane operations may rely on some form of absorption, such as into an amine solution, or a solution of hot potassium carbonate.

Representative membrane operations are the subject of copending parent application Ser. Nos. 08/143,283, 143,285 and 143,496.

As described in the parent applications, these membrane operations rely on the availability of two membrane types: one, cellulose acetate, or a material with similar properties, characterized by a mixed gas carbon dioxide/methane selectivity of about 20 and a mixed gas hydrogen sulfide/methane selectivity of about 25; the other an improved membrane with a much higher mixed gas hydrogen sulfide/methane selectivity of at least about 30, 35 or 40 and a mixed gas carbon dioxide/methane selectivity of at least about 12. These selectivities must be achievable with gas streams containing at least methane, carbon dioxide and hydrogen sulfide and at feed pressures of at least 500 psig, more preferably 800 psig, most preferably 1,000 psig. The availability of the two membrane types enables treatment processes balanced in terms of the two membranes, so as to optimize any process attribute accordingly, to be designed.

Also, as in the parent applications, it is possible, through computer modeling, to define gas composition zones in which a particular treatment process is favored. For example, if it is the primary goal to minimize methane loss in the membrane permeate, it may be better to carry out the treatment using only the more hydrogen-sulfide-selective membrane, only the more carbon-dioxide-selective membrane or a mixture of both, depending on the particular feed gas composition. Similar determinations may be made if the amount of membrane area used is to be minimized, the costs and energy of recompression are to be kept below a target value, the hydrogen sulfide concentration in the permeate is to be maximized, the overall operating costs are to be reduced, or any other membrane process attribute is to be the key design factor. The most preferred material for the more carbon-dioxide-selective membrane is cellulose acetate or its variants. The most preferred material for the more hydrogen-sulfide-selective membrane is a polyamide-polyether block copolymers having the general formula

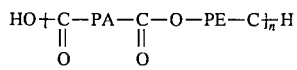

where PA is a polyamide segment, PE is a polyether segment and n is a positive integer. Such polymers are available commercially as Pebax® from Atochem Inc., Glen Rock, N.J. or as Vestamid® from Nuodex Inc., Piscataway, N.J. The membrane process may be configured in a variety of ways for optimum performance.

SECOND STEP

The second step is an acid gas fractionation step. The acid gas feed stream to this step, which has been removed from the bulk gas by the first treatment step, principally contains hydrogen sulfide and carbon dioxide, plus, if the first treatment step is a membrane-based step, some remaining methane and/or water vapor and/or other gases. The purpose of this fractionation step is to divide the acid gas stream into two fractions: (i) a permeate fraction containing a high concentration of hydrogen sulfide, such as above about 10 vol %, and a low concentration, such as below about 5 vol %, of methane; (ii) a residue fraction containing a very low concentration of hydrogen sulfide, such as below about 2,000 ppm, and most of the carbon dioxide. The preferred membranes for this fractionation step should have a hydrogen sulfide/carbon dioxide selectivity, under the operating conditions of the process, of at least about 3, more preferably at least about 4 and most preferably at least about 7. The preferred membrane materials to achieve these properties are the polyamide-polyether block copolymers described above.

THIRD STEP

The third step is a sulfur-fixing step to convert hydrogen sulfide into elemental sulfur, sulfuric acid or some other environmentally benign form. The hydrogen-sulfide-concentrated permeate stream from the fractionation step forms the feed to this step. Most preferably, the composition of the hydrogen sulfide concentrated feed stream is such that the hydrogen sulfide may be converted to elemental sulfur by a low-cost, reliable process, such as the Claus process. Other alternative preferred processes for the third step are redox processes.

It is an object of the invention to provide processes for removing acid gases from natural gas.

It is an object of the invention to provide improved processes for treating acid gases to recover elemental sulfur.

It is an object of the invention to provide processes for treating gas streams containing acid gases cheaply and efficiently.

It is an object of the invention to provide processes for fractionating gas streams containing mixtures of hydrogen sulfide and carbon dioxide, and thereafter fixing the sulfur in an environmentally benign form.

The processes of the invention exhibit a number of advantages compared with previously available acid gas treatment technology, thus:

(a) With regard to the three-step processes of the invention as a whole, provision of a membrane with useful hydrogen sulfide/carbon dioxide selectivity under real operating conditions makes it possible, for the first time, to apply membrane treatment to fractionate acid gas streams. Secondly, the fractionated stream is much easier and cheaper to treat or dispose of than would otherwise be possible. In particular, the hydrogen-sulfide-rich fraction is comfortably within the composition range for efficient Claus plant operation, and the carbon dioxide rich fraction is sufficiently free of hydrogen sulfide for venting or simple disposal. Thirdly, the burden on the first step bulk separation process used to remove the acid gases from the raw gas stream is eased. Since no fractionation between hydrogen sulfide and carbon dioxide is required here, the processes used in the first step can be simple and economical.

(b) With regard to a membrane-based first bulk separation step, provision of a membrane with much higher selectivity for hydrogen sulfide over methane makes it possible, for the first time, to apply membrane treatment efficiently to gas streams characterized by relatively high concentrations of hydrogen sulfide. Secondly, the processes are much better at handling gas streams of high relative humidity. Much greater flexibility to adjust membrane operating and performance parameters is provided by the availability of two types of membranes and lastly, the process can be optimized for any chosen process attribute by calculating the appropriate membrane mix to use.

(c) With regard to the current invention as applied to natural gas treatment, it is sometimes possible to bring a natural gas stream into pipeline specifications for all three of carbon dioxide, hydrogen sulfide and water vapor using one or two simple membrane treatments. Furthermore, overprocessing of the gas stream by removing the carbon dioxide to a much greater extent than is actually necessary, simply to bring the hydrogen sulfide content down, can be avoided.

DETAILED DESCRIPTION OF THE INVENTION

The term intrinsic selectivity, as used herein, means the selectivity of the polymer material itself, calculated as the ratio of the permeabilities of two gases or vapors through a thick film of the material, as measured with pure gas or vapor samples.

The term ideal selectivity, as used herein, means the selectivity of a membrane, calculated as the ratio of the permeabilities of two gases or vapors through the membrane, as measured with pure gas or vapor samples.

The terms mixed gas selectivity and actual selectivity, as used herein, means the selectivity of a membrane, calculated as the ratio of the permeabilities of two gases or vapors through the membrane, as measured with the actual gas mixture, and under the actual operating conditions, of the process in question.

The terms sulfur fixing and sulfur fixation, as used herein, mean conversion of hydrogen sulfide to elemental sulfur, sulfuric acid or another environmentally acceptable product.

The invention is a process that has three steps:
1. An acid gas removal step, to remove both hydrogen sulfide and carbon dioxide from the primary gas stream;
2. A membrane fractionation step, to separate hydrogen sulfide from carbon dioxide;
3. A sulfur-fixing step.

Figure 1:
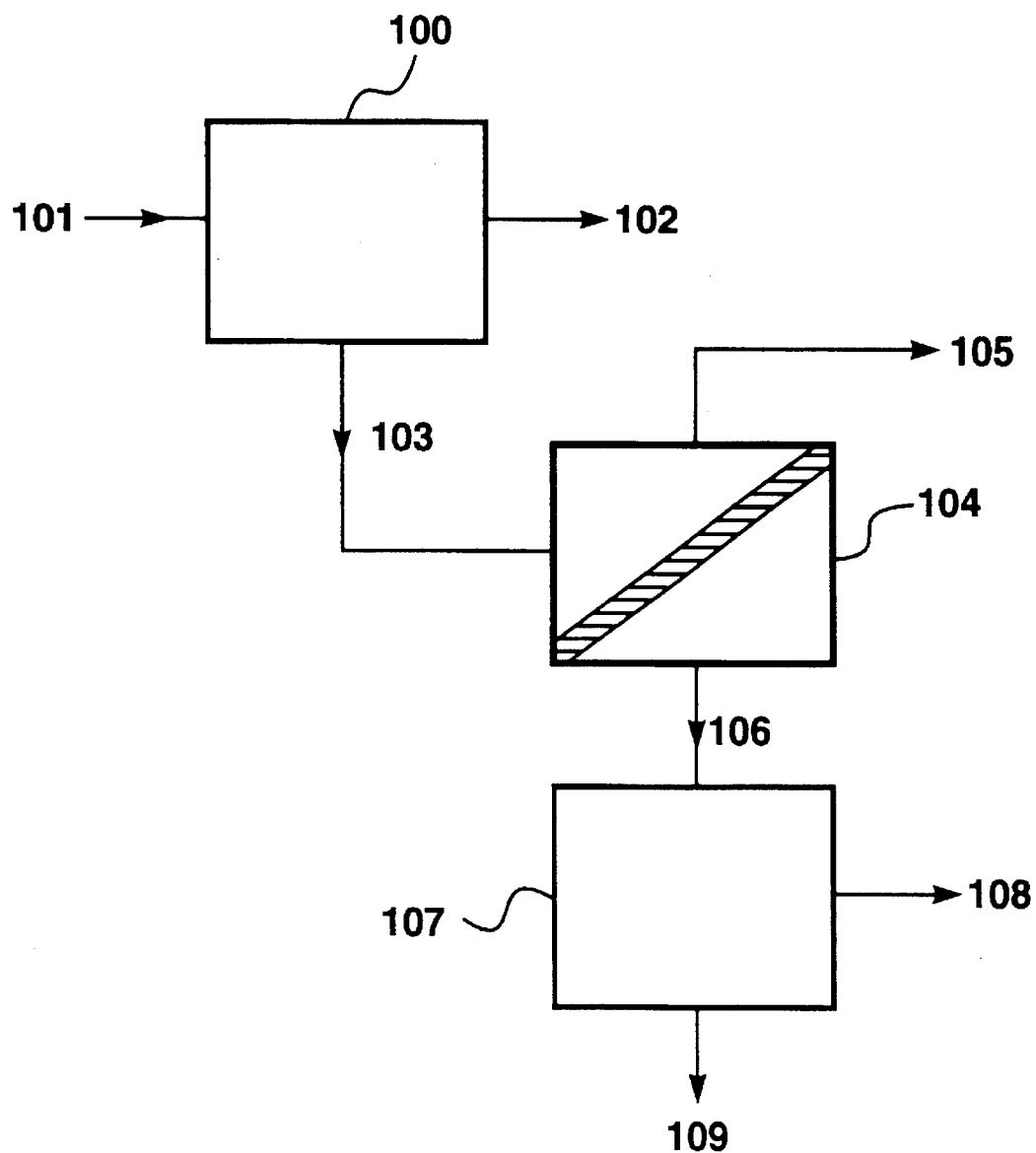
FIG. 1 is a basic schematic drawing of a three-step process including a first acid gas removal step, a second membrane fractionation step and a third sulfur-fixing step.

The process is shown in schematic form in FIG. 1, wherein stream 101 represents the primary gas stream, box 100 represents the first acid gas removal step, box 104 represents the membrane fractionation step and box 107 represents the sulfur-fixing step.

FIRST STEP

The first step of the process, removal of both hydrogen sulfide and carbon dioxide from the primary gas stream, 101, can be carried out as a single operation or optionally as two sub-operations: (a) bulk separation of acid gas components from the primary gas stream, and (b) additional treatment of the sweetened primary gas stream to meet natural gas pipeline or other specifications.

This first step may be carried out by a non-membrane operation, a membrane operation or a combination of both. However this step is carried out, it produces an acid-gas-enriched stream, 103, containing hydrogen sulfide and carbon dioxide and, depending on the process used, other components, and an acid-gas-depleted stream, 102, which may optionally be passed to the pipeline, if the primary gas stream is natural gas, or to some other target destination.

If a non-membrane step is used, it may be of any appropriate type, such as absorption, adsorption, chemical reaction or the like. Absorption processes using alkanolamines are widely used in the gas industry at present. The reactivity and relatively low cost, particularly of MEA (monoethanolamine) and DEA (diethanolamine), has made them the workhorse sorbents of the industry. The absorption process involves passing the acid-gas-laden stream into an aqueous solution of the amine of choice, which reacts with the hydrogen sulfide and carbon dioxide in the stream. The amine solution is regenerated for further use by heating, yielding a regenerate stream or streams containing the acid gases that were previously absorbed.

Alternatively, other sorbent solutions, such as hot potassium carbonate, may be used, particularly if the gas stream contains a large amount of acid gas. Potassium carbonate solutions may be regenerated by steam stripping. Promoters or activators, for example DEA (Benfield process), arsenic trioxide, selenous acid and tellurous acid (Giammarco-Vetrocoke process), can be added to the basic potassium carbonate solution. In applications for the removal of hydrogen sulfide, tripotassium phosphate (Shell Development Company) may be used.

As yet another alternative, physical sorbents may be used. Representative absorption processes that make use of physical sorbents include the Selexol process (Norton Company), which uses the dimethyl ether of polyethylene glycol, the Rectisol and Purisol processes (Lurgi Gesellschaft für Warmetechnik), Estasolven process (Friedrich Uhde GmbH) and the Sulfinol process (Shell International Research).

If a membrane step is used, it should preferably be of the type described in copending parent application Ser. Nos. 08/143,283, 143,285 and 143,496. These membrane operations rely on the availability of two membrane types: one, cellulose acetate, or a material with similar properties, characterized by a mixed gas carbon dioxide/methane selectivity of about 20 and a mixed gas hydrogen sulfide/methane selectivity of about 25; the other a membrane with a much higher mixed gas hydrogen sulfide/methane selectivity of at least about 30, 35 or 40 and a mixed gas carbon dioxide/methane selectivity of at least about 12. These selectivities must be achievable with gas streams containing at least methane, carbon dioxide and hydrogen sulfide and at feed pressures of at least 500 psig, more preferably 800 psig, most preferably 1,000 psig.

The invention provides three forms of membrane operation for the first step of the process:
1. Using only the more hydrogen-sulfide-selective membrane
2. Using only the more carbon-dioxide-selective membrane
3. Using a combination of both types of membrane.

Based on the different permeation properties of the two membrane types, it is possible, through computer modeling, to define gas composition zones most amenable to each one of these three types of membrane operations. The basis and methodology for the computer modeling is described in detail in copending parent application Ser. Nos. 08/143,283, 143,285 and 143,496, which are incorporated herein by reference in their entirety.

Figure 9:
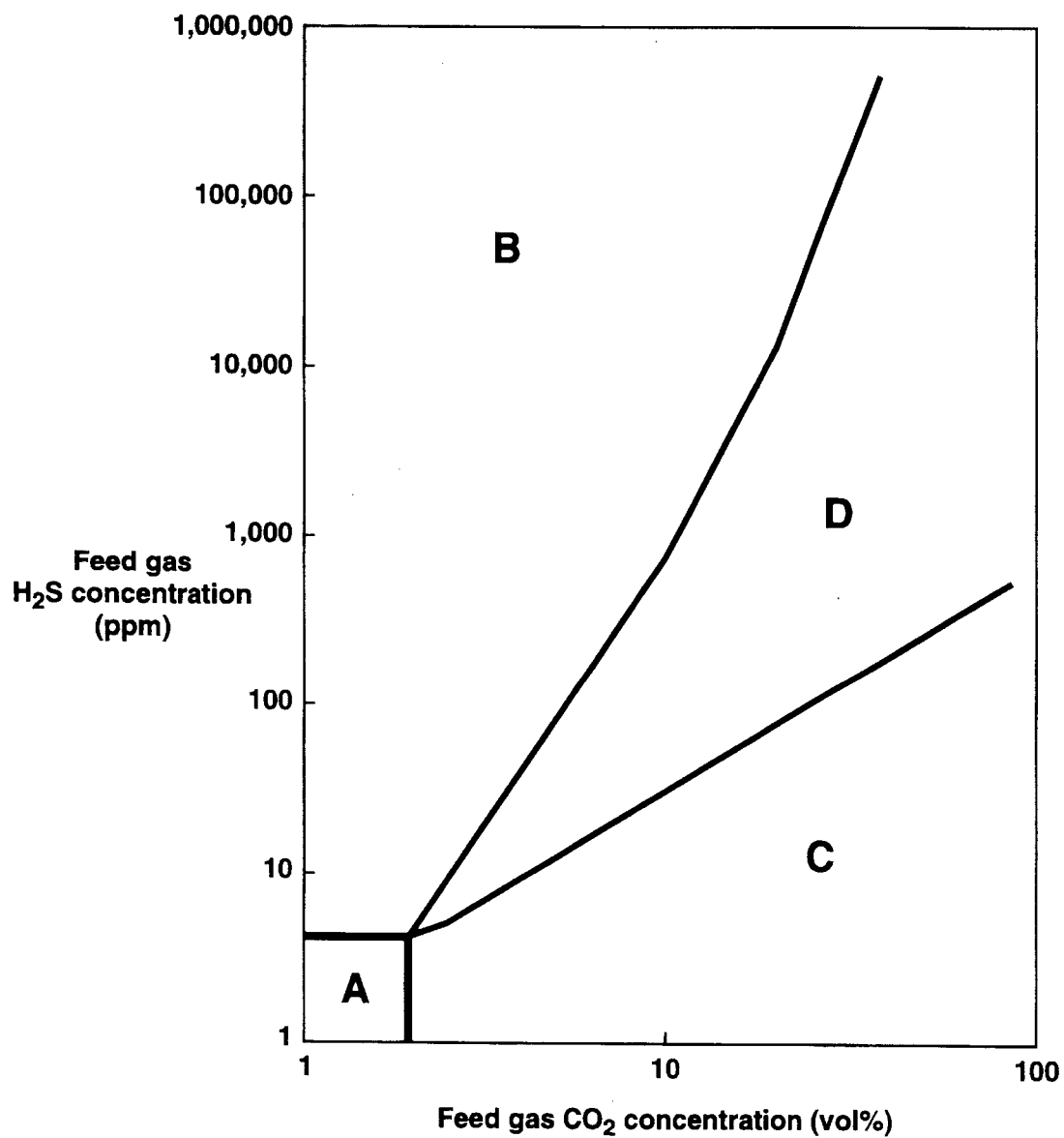
FIG. 9 is a diagram showing zones in which particular membranes should be used to separate hydrogen sulfide and carbon dioxide from methane.

Referring now to FIG. 9, this shows a typical zone diagram, with feed gas carbon dioxide concentration on one axis and hydrogen sulfide concentration on the other. The diagram was prepared by running a series of membrane separation computer simulations for hypothetical three-component (methane, carbon dioxide, hydrogen sulfide) gas streams of particular flow rates and compositions. In all cases, the target was to bring the stream to a pipeline specification of 4 ppm hydrogen sulfide and 2% carbon dioxide. The membrane properties were assumed to be as follows:

| More $CO_2$-selective membrane: | Carbon dioxide/methane selectivity: | 20 |
|---|---|---|
| | Hydrogen sulfide/methane selectivity: | 25 |
| | Methane flux: $7.5 \times 10^{-6}$ cm$^3$(STP)/cm$^2$.s.cmHg | |
| More $H_2S$-selective membrane: | Carbon dioxide/methane selectivity: | 13 |
| | Hydrogen sulfide/methane selectivity: | 50 |
| | Methane flux: $7.5 \times 10^{-6}$ cm$^3$(STP)/cm$^2$.s.cmHg | |

Figure 10:
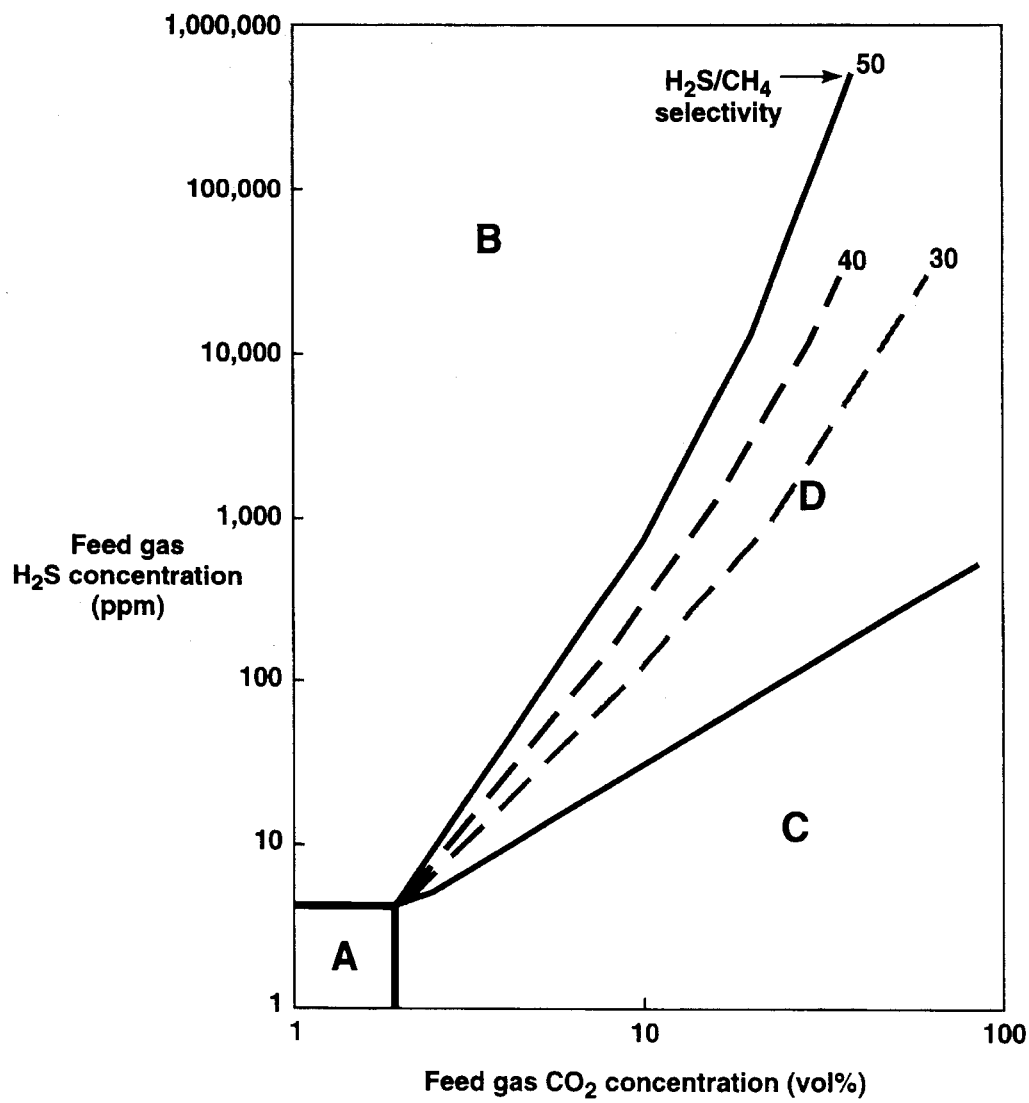
FIG. 10 is a diagram showing zones in which particular membranes should be used to separate hydrogen sulfide and carbon dioxide from methane, based on different hydrogen sulfide/methane selectivities.
Figure 11:
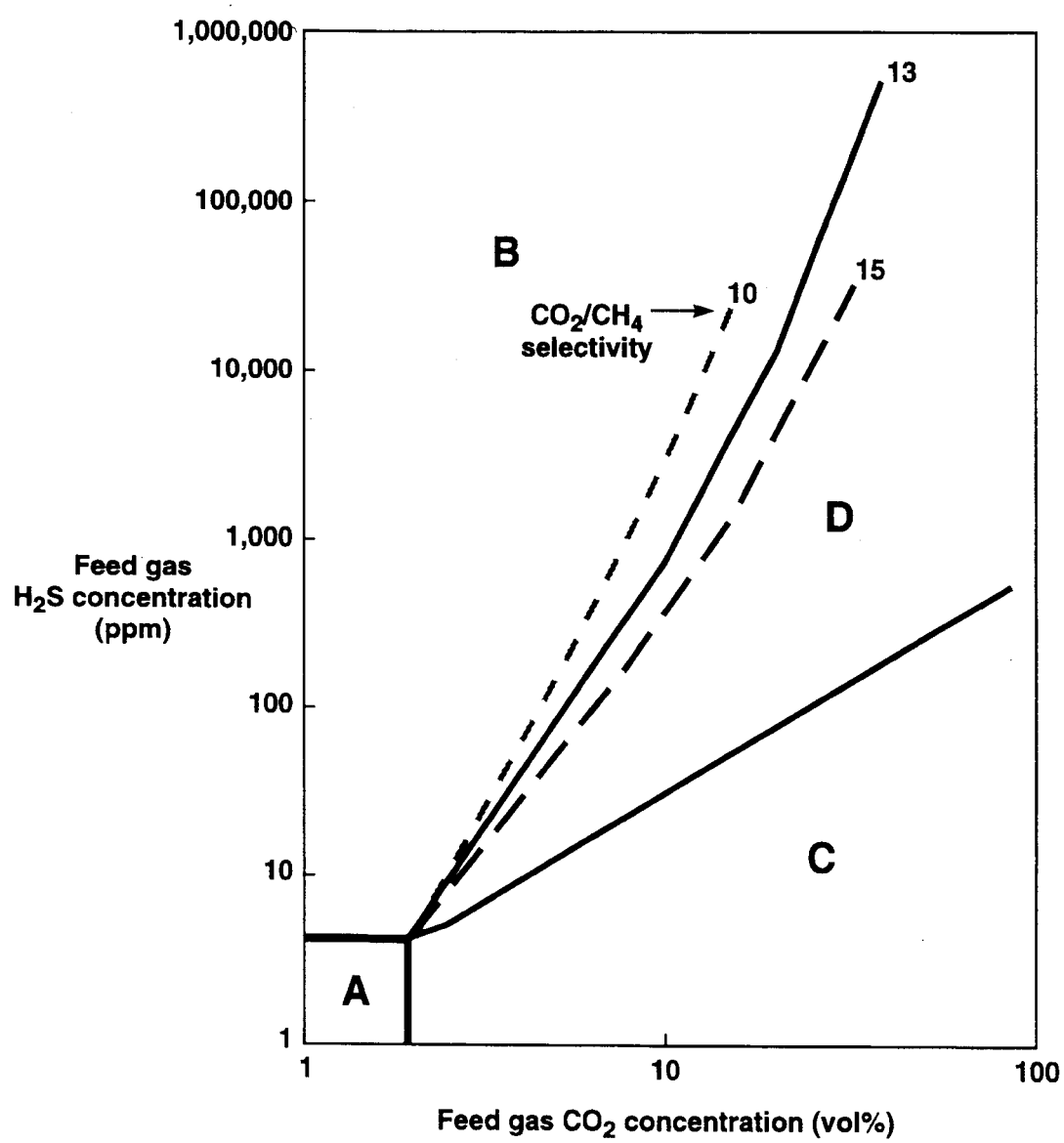
FIG. 11 is a diagram showing zones in which particular membranes should be used to separate hydrogen sulfide and carbon dioxide from methane, based on different carbon dioxide/methane selectivities.
Figure 12:
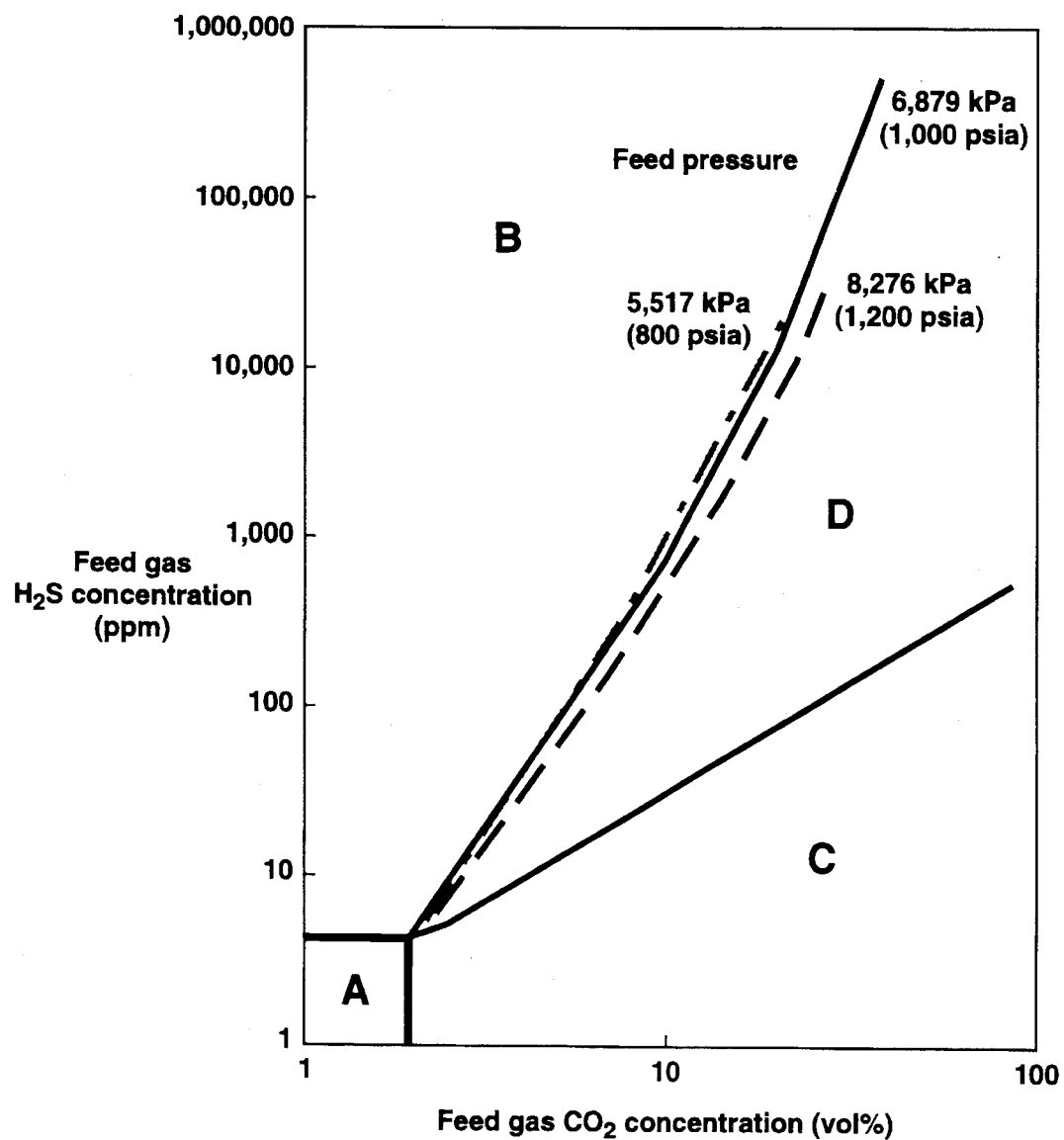
FIG. 12 is a diagram showing zones in which particular membranes should be used to separate hydrogen sulfide and carbon dioxide from methane, for different feed gas pressures.

In each case, the methane loss into the permeate stream that would occur if a one-stage membrane separation process were to be carried out was calculated, and was used to define zones of least methane loss. As can be seen, FIG. 9 is divided into four zones. In zone A, no treatment is required, because the gas already contains less than 2% carbon dioxide and less than 4 ppm hydrogen sulfide. In zone B, methane loss is minimized if the more hydrogen-sulfide-selective membrane alone is used. In zone C, methane loss is minimized if the more carbon-dioxide-selective membrane alone is used. In zone D, methane loss is minimized by using a combination of the two membrane types. The zones are calculated based on the membrane selectivity and their exact position will change if the membrane selectivity changes. FIGS. 10 and 11 show the change in the B/D boundary for hydrogen sulfide/methane selectivities of 30, 40 and 50 and for carbon dioxide/methane selectivities of 10, 13 and 15. As can be seen, the Zone B/D boundary moves to the right as the ability of the membrane to separate carbon dioxide improves. Likewise, the boundary moves to the right as the selectivity for hydrogen sulfide over methane decreases. Although the area where the more hydrogen-sulfide-selective membranes should be used is larger at lower hydrogen sulfide/methane selectivity, the methane losses encountered in using the membrane will be greater. FIG. 12 shows the change in the B/D boundary for different feed pressures. As can be seen, the zone boundary is relatively insensitive to changes in the feed pressure.

The zone diagram may be used directly to determine the best type of membrane to use for a specific separation by reading off the zone into which the feed composition fits. Another way to use the diagram is to define concentration bands that can serve as guidelines in selecting a membrane process, as described in more detail in the copending parent applications.

If a combination of the two membrane types is to be used, the order in which the membrane types are encountered by the gas stream can be chosen according to the specifics of the application. If the raw gas stream contains significant amounts of water and hydrogen sulfide, for example, it is preferable to use the more hydrogen-sulfide-selective membrane first, since cellulose acetate membranes have been shown to lose both selectivity and permeability substantially if exposed to combinations of water vapor and hydrogen sulfide. They also do not withstand relative humidities above about 30% very well. The polyamide-polyether block copolymer membranes that are preferred as the more hydrogen-sulfide-selective membrane, on the other hand, are not usually damaged by water or hydrogen sulfide, and can handle gas streams having high relative humidities, such as above 30% RH, above 90% RH and even saturation. Furthermore, the membranes are very permeable to water vapor, and so can be used to dehydrate the gas stream before it passes to the second bank of modules. If humidity and hydrogen sulfide content are not issues, and no other factors that affect only one of the membrane types are at work, then the total methane loss into the permeate streams and the total membrane area required to perform the separation should be essentially independent of the order in which the membranes are positioned.

Any membranes that can achieve the necessary carbon dioxide/methane selectivity and hydrogen sulfide/methane selectivity, plus commercially useful transmembrane fluxes, can be used. Preferably the membranes should be characterized by transmembrane methane fluxes of at least $1\times10^{-6}$ cm$^3$(STP)/cm$^2$·s·cmHg, more preferably by transmembrane methane fluxes of at least $4\times10^{-6}$ cm$^3$(STP)/cm$^2$·s·cmHg, and most preferably by transmembrane methane fluxes of at least $1\times10^{-5}$ cm$^3$(STP)/cm$^2$·s·cmHg.

For the more carbon-dioxide-selective membrane, the preferred membranes are the cellulose acetate membranes that are already in use. Other candidates include different cellulose derivatives, such as ethylcellulose, methylcellulose, nitrocellulose and particularly other cellulose esters. Otherwise, membranes might be made from polysulfone, polyethersulfone, polyamides, polyimides, polyetherimides, polyacrylonitrile, polyvinylalcohol, other glassy materials or any other appropriate material. Usually, glassy materials have enough mechanical strength to be formed as integral asymmetric membranes, the production of which is well known in the art. The invention is not intended to be limited to any particular membrane material or membrane type, however, and encompasses any membrane, of any material, that is capable of meeting the target permeation properties, including, for example, homogeneous membranes, composite membranes, and membranes incorporating sorbents, carriers or plasticizers.

For the more hydrogen-sulfide-selective membrane, the most preferred membranes have hydrophilic, polar elastomeric selective layers. The mobility selectivity of such materials, although it favors hydrogen sulfide and carbon dioxide over methane, is modest compared to glassy materials. Because the membrane is hydrophilic and polar, however, the sorption selectivity strongly favors hydrogen sulfide, carbon dioxide and water vapor over non-polar hydrophobic gases such as hydrogen, methane, propane, butane etc. Although the selectivity of such materials is affected by swelling in the presence of condensable components, we have discovered that hydrogen sulfide/methane selectivities of at least 30 or 35, sometimes at least 40 and sometimes 50, 60 or above can be maintained, even with gas mixtures containing high acid gas concentrations, even at high relative humidity, and even at high feed pressures up to 500 psig, 800 psig, 1,000 psig or above. These are unusual and very useful properties. These properties render the membranes unusually suitable for treating natural gas, which often contains multiple components, has high humidity and is at high pressure. Preferred membrane materials are those that exhibit water sorption greater than 5%, more preferably greater than 10%, when exposed to liquid water at room temperature. Particularly preferred are segmented or block copolymers that form two-domain structures, one domain being a soft, rubbery, hydrophilic region, the other being harder and glassy or more glassy. Without wishing to be bound by any particular theory of gas transport, we believe that the soft, rubbery domains provide a preferential pathway for the hydrogen sulfide and carbon dioxide components; the harder domains provide mechanical strength and prevent excessive swelling, and hence loss of selectivity, of the soft domains. Polyether blocks are preferred for forming the soft flexible domains; most preferably these blocks incorporate polyethylene glycol, polytetramethylene glycol or polypropylene glycol, to increase the sorption of polar molecules by the membrane material.

One specific example of the most preferred membrane materials that could be used for the more hydrogen-sulfide selective membrane is polyamide-polyether block copolymers having the general formula

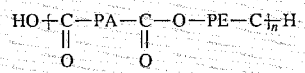

where PA is a polyamide segment, PE is a polyether segment and n is a positive integer. Such polymers are available commercially as Pebax® from Atochem Inc., Glen Rock, N.J. or as Vestamid® from Nuodex Inc., Piscataway, N.J. The polyamide block gives strength and is believed to prevent the membrane swelling excessively in the presence of water vapor and/or carbon dioxide.

Other specific examples include polyether- and polyester-based polyurethanes. Representative polymer formulations and recipes are given, for example, in U.S. Pat. No. 5,096,592, in which the copolymers are made by first preparing a prepolymer by combining simple diols and aliphatic or aromatic dicarboxylic acids with an excess of diacid to prepare diacid-terminated blocks, then chain-extending these with appropriately selected polypropylene or polyethylene glycol segments.

Usually, rubbery materials do not have enough mechanical strength to be formed as integral asymmetric membranes, but are instead incorporated into composite membranes, in which the rubbery selective layer is supported on a microporous substrate, often made from a glassy polymer. The preparation of composite membranes is also well known in the art. It is commonly thought that rubbery composite membranes do not withstand high-pressure operation well, and to date, such membranes have not been generally used in natural gas treatment, where feed gas pressures are often as high as 500 psig or 1,000 psig. We have found, however, that composite membranes, with thin enough rubbery selective layers to provide a transmembrane methane flux of at least $1\times10^{-6}$ cm$^3$(STP)/cm$^2$·s·cmHg, can be used satisfactorily at high feed pressures and not only maintain their integrity but continue to exhibit high selectivity for hydrogen sulfide over methane. The membrane operation may be configured in a variety of ways for optimum performance, as discussed at length in the copending parent applications and incorporated herein by reference.

As mentioned above, the first step of the process may involve a primary bulk separation and a secondary treatment of the partially sweetened stream. For example, the bulk separation may be performed by a membrane process and the secondary polishing separation by an amine absorption process. Any convenient combination of the membrane and non-membrane operations may be used. Frequently, the goal of the secondary polishing step will be to produce a stream that meets natural gas pipeline specification in terms of hydrogen sulfide, carbon dioxide and water vapor content.

In general, acid gas separation techniques that are candidates for the first step of the process can be divided into four categories as shown in Table 2.

TABLE 2

| Process | Typical relative capital cost | Other gases present in acid gas stream? | Ability to fractionate $H_2S$ from $CO_2$ |
|---|---|---|---|
| Potassium carbonate absorption | 1 | No | None |
| Membranes | 1.5–2.0 | Yes | Some |
| Amine absorption | 1.1–2.0 | No | Some |
| Specialized physical sorbents | 1.5–5.0 | No | Good |

The table shows that there is a approximate trade-off between the process capital and operating costs and the ability to fractionate the acid gas stream. Processes that use sorption into hot potassium carbonate (for example, Benfield, Hot Pot) are the least expensive, but have no hydrogen sulfide/carbon dioxide fractionation capabilities. This means that the relative proportions of carbon dioxide and hydrogen sulfide in the primary feed stream and the regenerate streams are about the same. In other words, unless the primary gas stream was exceedingly heavily laden with hydrogen sulfide, such as containing 8 vol %, 10 vol % or more, the regenerate stream will not contain enough hydrogen sulfide to be suitable for treatment in a Claus plant. This means that sulfur fixation must be carried out by one of the more expensive and/or complicated alternatives to the Claus process.

At the other end of the scale are the processes using specialized physical sorbents. A typical example is the Rectisol process, which uses sorption into refrigerated methanol. This process is extremely selective and produces two regenerate streams, one containing essentially all of the hydrogen sulfide, the other the bulk of the carbon dioxide with only trace amounts of hydrogen sulfide. The hydrogen sulfide concentration in the concentrate stream is typically at least 25 vol % and may be as high as 60 vol %, 70 vol % or more, so oxidation to elemental sulfur by the Claus process is easily achieved. The capital cost of the process is, however often as much as four times greater than that of an equivalent Benfield hot potassium carbonate unit, for example.

The amine and membrane processes are generally intermediate in costs and fractionation capabilities. The simplest and cheapest amine scrubbing processes are similar to the potassium carbonate processes in that they are essentially unselective between hydrogen sulfide and carbon dioxide. In recent years, however, a number of companies have developed proprietary amine compounds that are partially selective to hydrogen sulfide. In other words, like the membrane processes of the parent applications, they produce gas streams having a different hydrogen sulfide and carbon dioxide content than the primary gas stream that is fed to them for treatment. Thus, depending on the specific amines used, the amine-sorption process may be tailored to some extent. Nevertheless, the stream produced is usually still too low in hydrogen sulfide content for easy conversion to sulfur. The more selective amine processes, such as the UOP UCARSOL process, typically yield two regeneration streams, one containing up to a few percent hydrogen sulfide, such as 5 vol %, and usually no higher than about 7 vol %, plus carbon dioxide; the other essentially hydrogen sulfide free, containing the remainder of the carbon dioxide. Even if the hydrogen-sulfide-rich stream contains as much as 7 vol %, this is on the low end of streams easily suited to sulfur fixing by the Claus process.

Likewise, as shown in original Examples 22, 27, 30, 31, 33, 34, 36 and elsewhere in copending parent application Ser. No. 143,285, a membrane-based acid gas removal step might typically be able to produce a hydrogen-sulfide-rich stream containing 1 vol %, 3 vol % or 4 vol % for example, and might be hard pressed to do better in any economically practical configuration, unless the primary feed was very heavily contaminated with hydrogen sulfide.

One of the principal goals of the invention is to provide a process that enables simple, low-cost processes for the first acid gas removal step and the final sulfur fixation step to be combined. Therefore the preferred processes for the first acid gas removal step are the potassium carbonate or amine absorption processes or a membrane process.

SECOND STEP

The second step, (box 104 in FIG. 1), is an acid gas fractionation step, designed to separate the hydrogen-sulfide- and carbon-dioxide-containing acid gas stream from the first step into a concentrated hydrogen-sulfide-containing fraction and a substantially hydrogen-sulfide-free carbon dioxide fraction. If the feed stream, 103 in FIG. 1, to this second step is from an absorption-based first step, such as potassium carbonate or amine sorption, the feed stream may contain only hydrogen sulfide and carbon dioxide. If the sorbent has been regenerated by steam stripping, for example, the stream may also contain water vapor. If the feed stream is coming from a membrane unit, it may still contain some methane, nitrogen, water vapor or other components that were present in the primary gas stream.

The concentrated hydrogen-sulfide-containing fraction is normally the permeate stream, 106, from this membrane fractionation step, and should contain at least about 10 vol % hydrogen sulfide, more preferably at least about 15 vol % hydrogen sulfide and most preferably at least about 20 vol % hydrogen sulfide. If methane is present in the feed stream to the fractionation step, the methane content of the concentrated hydrogen-sulfide-containing fraction should be reduced, if necessary, to no greater than about 10 vol %, more preferably no greater than about 5 vol % and most preferably no greater than about 3 vol %.

The substantially hydrogen-sulfide-free fraction is normally the residue stream, 105, from this membrane fractionation step, and should contain no more than about 20 vol %, preferably no more than about 10 vol % of the hydrogen sulfide that was in the feed to the fractionation step. Typical target hydrogen sulfide concentrations should be less than about 2,000 ppm and more preferably less than 1,000 ppm. If other components such as methane or nitrogen were present in the feed to the fractionation step, they will also be contained in this fraction. Depending on the exact composition of this residue stream disposal options include venting, flaring, reinjection, treatment by a small wet-oxidation unit, such as Lo-Cat or Sulferox, which oxidizes the remaining hydrogen sulfide completely to sulfur, or treatment by some other specialized scavenging or sulfur recovery process, such as Sulfa-Scrub, Sulfa-Check, Chemsweet, Supertron 600, solid iron sponge or solid zinc oxide.

The preferred membranes for this fractionation step should have a hydrogen sulfide/carbon dioxide selectivity, under the operating conditions of the process, of at least about 3, more preferably at least about 4, yet more preferably at least about 5 and most preferably at least about 7. Preferably the membranes should be characterized by transmembrane carbon dioxide fluxes of at least $2 \times 10^{-5}$ $cm^3(STP)/cm^2 \cdot s \cdot cmHg$, and most preferably by transmembrane carbon dioxide fluxes of at least $5 \times 10^{-5}$ $cm^3(STP)/cm^2 \cdot s \cdot cmHg$.

The more preferred membranes have hydrophilic, polar elastomeric selective layers. The mobility selectivity of such materials, although it favors hydrogen sulfide and carbon dioxide over methane, is modest compared to glassy materials. Because the membrane is hydrophilic and polar, however, the sorption selectivity strongly favors hydrogen sulfide, carbon dioxide and water vapor over non-polar hydrophobic gases such as hydrogen, methane, propane, butane etc. Although the selectivity of such materials is affected by swelling in the presence of condensable components, we have discovered that hydrogen sulfide/carbon dioxide selectivities of at least 3 or 4, and under some circumstances as high as 5, 7 or above can be attained, even with gas mixtures containing high acid gas concentrations, even at high relative humidity, and even at high feed pressures up to 200 psig, 300 psig, 400 psig or above. These are unusual and very useful properties. These properties render the membranes unusually suitable for treating mixed acid gas streams.

In general, the hydrogen sulfide/carbon dioxide selectivity of the membranes decreases with increasing feed pressure. For the intermediate fractionation step, therefore, it is preferred to operate at relatively low feed pressures, such as below 500 psig, more preferably below 300 psig, even more preferably below 250 psig and most preferably below 200 psig. At feed pressures below about 250 psig, selectivities of 5, 7 or more can be obtained, subject to other operating conditions.

As in many membrane processes, the lower the operating temperature, the better the selectivity. In general, it is preferred to perform the fractionation separation at a temperature of not greater than about 20° C., more preferably no greater than about 10° C., and most preferably down to even −20° C., depending on the effect on costs. Operation at very low temperatures is less desirable, because of the chilling costs involved.

The most preferred membrane materials are the same polymers and copolymers as those described above for the more hydrogen-sulfide-selective membrane that might be used for a membrane-based first step. Especially preferred are the Pebax and similar polyamide-polyether block copolymers.

Figure 2:
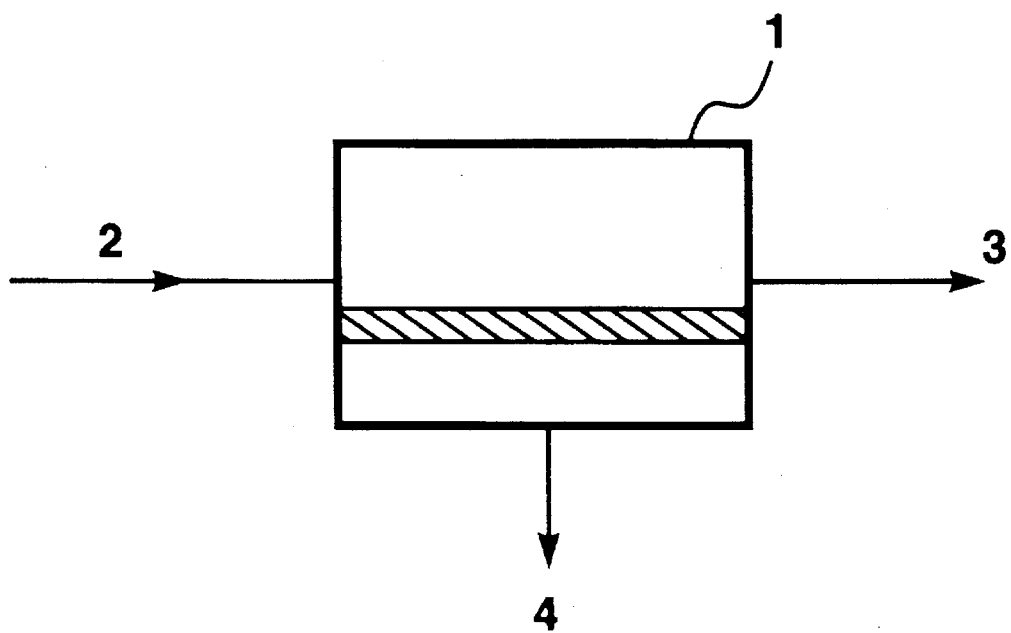
FIG. 2 is a basic schematic drawing of a one-stage membrane separation process.
Figure 5:
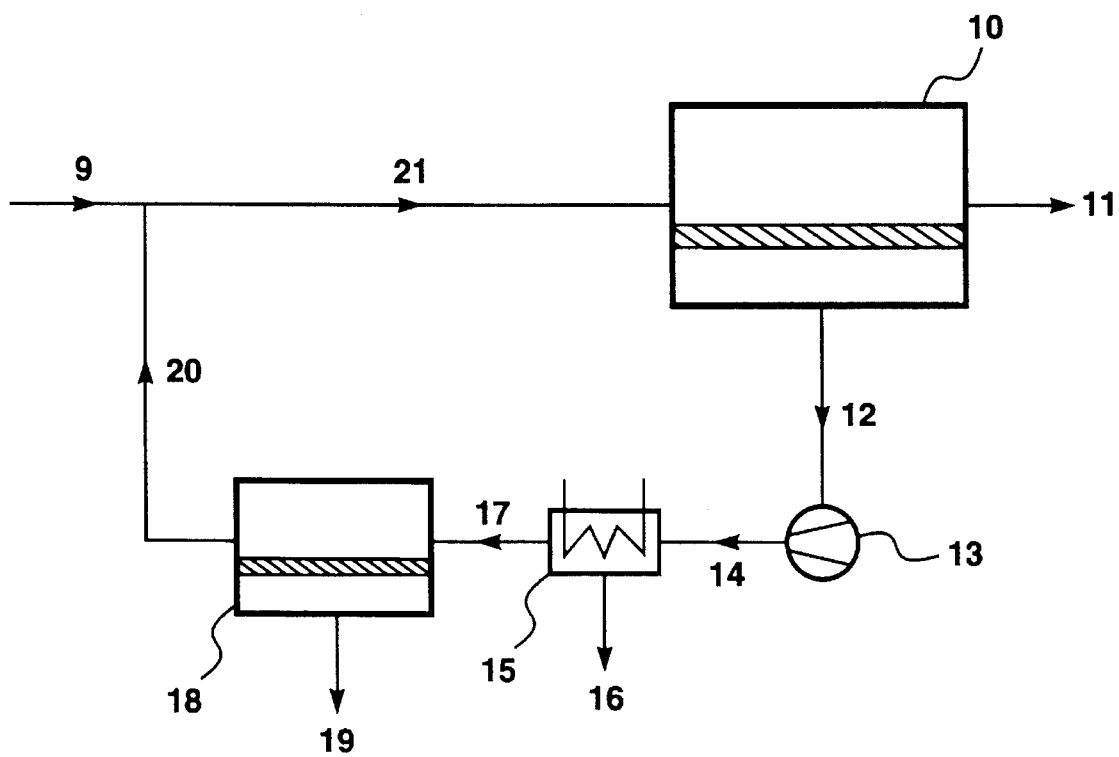
FIG. 5 is a basic schematic drawing of a typical two-stage membrane separation process.
Figure 6:
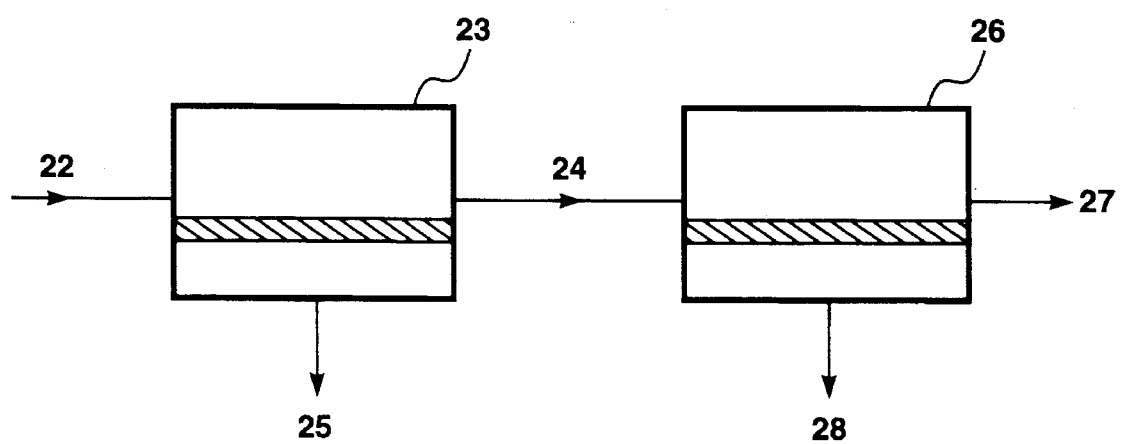
FIG. 6 is a basic schematic drawing of a two-step membrane separation process.

In its most basic embodiments, the membrane fractionation step makes use of a one-stage membrane design, using a single bank of membrane modules, as indicated schematically in FIG. 2. It will be apparent to those of ordinary skill in the art that many other configurations are possible. For example, a two-stage (or more complicated) membrane configuration, as shown schematically in FIG. 5, in which the permeate from the first stage becomes the feed for the second, may be used to further enrich the hydrogen sulfide content of the first permeate stream. A two-step membrane arrangement with two banks of membrane modules in series, such that the residue stream from the first bank becomes the feed to the second, as shown schematically in FIG. 6, is also possible, as are the more complicated combinations shown in FIGS. 7 and 8. For example, in FIG. 7 numerals 23, 26 and 32 indicate the three banks of membrane modules. The incoming gas stream 22 is mixed with the residue stream 34 from the second stage to form the feed gas stream 35 to the first membrane stage. The residue stream, 24, from the first bank of modules passes as feed to the second bank of the first stage, 26. In this case, the permeate streams 25 and 28 from the two steps of the first stage are combined as stream 29 to be recompressed in compressor 30, then passed as compressed stream 31 to the second membrane stage 32. Stream 27 is the carbon-dioxide-rich, hydrogen-sulfide-depleted residue stream. The second-stage hydrogen-sulfide-enriched permeate is withdrawn as stream 33. It will be apparent to those of ordinary skill in the art that two separate compressors could be used and the stream combined after compression. Also, in cases where the stream to be treated contains water vapor, the system could include a condenser as in FIG. 5 to condense permeating water vapor. In FIG. 8, numerals 38, 44 and 47 indicate the three banks of membrane modules. The incoming gas stream 36 is mixed with the residue stream 49 from module(s) 47 to form the feed gas stream 37 to the first membrane stage. The permeate stream, 40, from the first stage is recompressed in compressor 42. Compressor 42 drives two membrane units, the second stage unit, 44, and an auxiliary module or set of modules, 47, that are connected on the permeate side either directly or indirectly to the inlet side of the compressor, so as to form a loop. Thus, permeate stream 48 may be merged with permeate stream 40 to form combined stream 41. The recompressed, combined stream, 43, passes as feed to membrane unit 44, and the residue stream, 46, from membrane unit 44 passes as feed to membrane unit 47. Permeate is withdrawn from the loop as stream 45 and the treated residue exits as stream 39.

In all arrangements, recirculation of partially treated residue and/or permeate streams within the membrane fractionation step may be used and is desirable.

THIRD STEP

The third step in the process of the current invention (box 107 of FIG. 1) is disposal or conversion of the hydrogen sulfide concentrated stream from the intermediate fractionation step, preferably by fixing in the form of elemental sulfur, or sulfuric acid, stream 109. Stream 108 is the off-stream from this third step.

The most preferred process for the third step is the Claus process, which converts hydrogen sulfide to high-quality, saleable sulfur. The basic steps in the process involve burning the acid gas with stoichiometric amounts of air so that about ⅓ of the hydrogen sulfide is oxidized to sulfur dioxide. The incinerated stream is passed through a waste heat boiler and over a bauxite catalyst at about 700°–750° F. Under these conditions, the sulfur dioxide and hydrogen sulfide react to form elemental sulfur, which is condensed at about 320° F. The process can be repeated in second and third stages to increase the sulfur yield. With a two-stage plant, sulfur removal efficiencies of 95% are typical. The tail-gas from the plant can be treated to meet environmental standards before discharge. For efficient operation of the Claus plant, the hydrogen sulfide content of the incoming stream should be above about 8 vol %, and more preferably should be significantly higher, such as above about 10 vol %, yet more preferably above about 15 vol %, or most preferably above about 20 vol %. It is also important for efficient operation of the Claus plant that the feed to the Claus plant be relatively free of hydrocarbons such as methane. Typically, the gas should not contain more than about 5 vol % methane; less is preferred.

As a less preferred alternative, conversion of the hydrogen sulfide can be carried out using a redox process. Such processes are usually based on bringing the hydrogen sulfide into contact with a liquid suspension of oxidants such as polythionate, iron-cyanide complexes, iron oxide, thioarsenates or organic catalysts. After several reaction steps, elemental sulfur precipitates. The solvent can then be reoxidized and reused. Various commercial redox processes are available, including Manchester, Stretford A.D.A., Takahax, Thylox, Giammarco-Vetrocoke, Lo-Cat and Shell Sulfolane. Typically, redox processes are more applicable to the recovery of small tonnages of sulfur than the Claus process. The sulfur quality is poorer than that from a Claus plant and further refining is needed to make it saleable. Such processes can, however, be run with relatively low inlet hydrogen sulfide concentrations, such as above 2 vol % or more preferably above 4 vol %. Redox plants are, however, typically more expensive that a Claus plant of the same capacity. Thus it is much preferred to use the Claus process rather than a redox process for sulfur fixation. If the hydrogen sulfide content of the primary stream is very low, however, it may not be practical, even with the intermediate fractionation step taught herein, to reach a concentration of more than a few percent, such as between about 2 vol % and 8 vol %, in the hydrogen sulfide concentrated stream to be fed to the sulfur fixation step. In such cases, the provision of an intermediate fractionation step is still useful, in that it reduces the size of the redox plant.

The invention is now further illustrated by the following examples, which are intended to be illustrative of the invention, but are not intended to limit the scope or underlying principles of the invention in any way.

EXAMPLES

The examples are in five sets.

Set 1

Examples 1–10 are comparative examples that illustrate the performance of various glassy and rubbery polymers exposed to acid gases under a variety of conditions.

Example 1

Pure Gas Measurements. Polyimide Membranes of Two Grades (a) A three-layer composite membrane was prepared, using a microporous polyvinylidene fluoride (PVDF) support layer. The support was first coated with a thin, high-flux, sealing layer, then with a selective layer of polyimide (Matrimid Grade 5218, Ciba-Geigy, Hawthorne, N.Y.). Membrane stamps were mounted in a test cell and the permeation properties of the membrane were tested with pure carbon dioxide and with pure methane at a feed pressure of 50 psig. The results are listed in Table 3.

(b) A three-layer composite membrane was prepared, using a microporous polyvinylidene fluoride (PVDF) support layer. The support was first coated with a thin, high-flux, sealing layer, then with a selective layer of polyimide (custom-made 6FDA-IPDA). Membrane stamps were mounted in a test cell and the permeation properties of the membrane were tested with pure carbon dioxide and with pure methane at a feed pressure of 50 psig. The results are listed in Table 3.

Example 2

Mixed Gas Measurements. Polyimide Membranes of Two Grades (a) Three-layer composite membranes as in Example 1 (a) were tested with a gas mixture consisting of 800 ppm hydrogen sulfide, 4 vol % carbon dioxide, the balance methane. The feed pressure was 390 psig. The results are listed in Table 3.

(b) Three-layer composite membranes as in Example 1(b) were tested with a gas mixture consisting of 800 ppm hydrogen sulfide, 4 vol % carbon dioxide, the balance methane. Two feed pressures, 392 psig and 694 psig, were used. The results are listed in Table 3.

Example 3

Pure Gas Measurements. PTMSP Membrane

A composite membrane was prepared by coating a polytrimethyl-silylpropyne (PTMSP) layer onto a polyvinylidene fluoride (PVDF) support membrane. Membrane stamps were mounted in a test cell and the permeation properties of the membrane were tested with pure carbon dioxide and with pure methane at a feed pressure of 50 psig. The results are listed in Table 3.

Example 4

Mixed Gas Measurements. PTMSP Membrane

Composite membranes as in Example 3 were tested with a gas mixture consisting of 800 ppm hydrogen sulfide, 4 vol % carbon dioxide, the balance methane. The feed pressure was 390 psig. The results are listed in Table 3.

Example 5

Pure Gas Measurements. Silicone Rubber Membrane

A composite membrane was prepared by coating a silicone rubber layer onto a microporous support membrane. Membrane stamps were mounted in a test cell and the permeation properties of the membrane were tested with pure carbon dioxide and with pure methane at a feed pressure of 50 psig. The results are listed in Table 3.

Example 6

Mixed Gas Measurements. Silicone Rubber Membrane

Composite membranes as in Example 5 were tested with a gas mixture consisting of 650 ppm hydrogen sulfide, 4 vol % carbon dioxide, the balance methane. The feed pressure was 95 psig. The results are listed in Table 3.

Example 7

Pure Gas Measurements. Polybutadiene Membrane

A composite membrane was prepared by coating a polybutadiene (Scientific Polymer Products, Ontario, N.Y.) layer onto a PVDF support membrane. Membrane stamps were mounted in a test cell and the permeation properties of the membrane were tested with pure carbon dioxide and with pure methane at a feed pressure of 50 psig. The results are listed in Table 3.

Example 8

Mixed Gas Measurements. Polybutadiene Membrane

Composite membranes as in Example 7 were tested with a gas mixture consisting of 800 ppm hydrogen sulfide, 4 vol % carbon dioxide, the balance methane. The feed pressure was 394 psig. The results are listed in Table 3.

TABLE 3

Permeation Properties of Various Glassy and Rubbery Polymer Membranes

| Ex. # | Feed Pressure (psig) | Pressure Normalized Flux × $10^{-6}$ [cm$^3$(STP)/(cm$^2$·s·cmHg)] | | | Membrane Selectivity | | |
|---|---|---|---|---|---|---|---|
| | | $H_2S$ | $CO_2$ | $CH_4$ | $H_2S/CH_4$ | $CO_2/CH_4$ | $H_2S/CO_2$ |
| 1 (a) (pure gas) | 50 | — | 23.0 | 1.23 | — | 18.7 | — |
| 2 (a) (mixed gas) | 390 | 16.5 | 18.3 | 1.73 | 9.5 | 10.6 | 0.9 |
| 1 (b) (pure gas) | 50 | — | 156 | 2.47 | — | 63.2 | — |
| 2 (b) (mixed gas) | 392 | 25.1 | 51.5 | 2.40 | 10.5 | 21.4 | 0.5 |
| 2 (b) (mixed gas) | 694 | 24.8 | 47.9 | 2.51 | 9.9 | 19.1 | 0.5 |
| 3 (pure gas) | 50 | — | 524 | 281 | — | 1.9 | — |
| 4 (mixed gas) | 390 | 101 | 72.4 | 30.6 | 3.3 | 2.4 | 1.4 |
| 5 (pure gas) | 50 | — | 41.4 | 10.7 | — | 3.9 | — |
| 6 (mixed gas) | 95 | 107 | 50.8 | 15.5 | 6.9 | 3.3 | 2.1 |
| 7 (pure gas) | 50 | — | 119 | 21.2 | — | 5.4 | — |
| 8 (mixed gas) | 394 | 298 | 110 | 35.6 | 8.4 | 3.1 | 2.7 |

The highest selectivity for hydrogen sulfide over carbon dioxide was only 2.7, which was achieved with a rubbery polybutadiene membrane at about 400 psig feed pressure. In fact, a number of the glassy polyimide membranes were more permeable to carbon dioxide than hydrogen sulfide. Such membranes would not be useful for the membrane fractionation step of the current invention.

Example 9

Behavior of Cellulose Acetate Membranes in the Presence of Water Vapor

Figure 3:
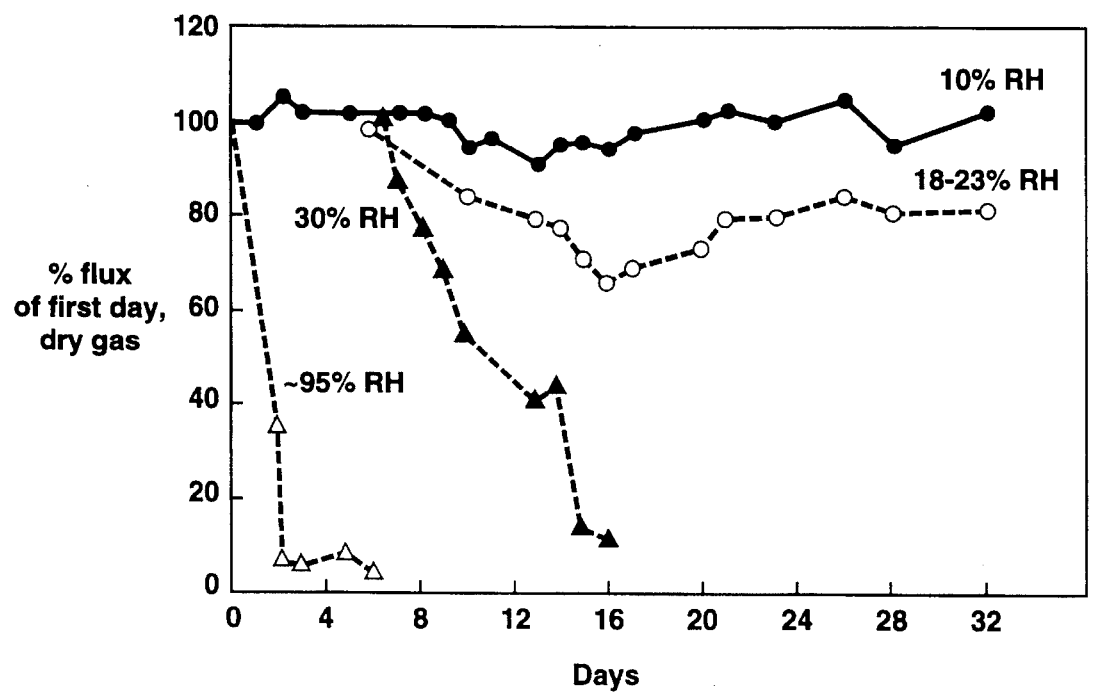
FIG. 3 is a graph showing the effect of water vapor on carbon dioxide flux through cellulose acetate membranes.

This comparative example is from the report by N. N. Li et al. to the Department of Energy ("Membrane Separation Processes in the Petrochemical Industry," Phase II Final Report, September 1987). Li et al. examined the effect of water vapor in a feed gas stream of carbon dioxide on transmembrane flux. FIG. 3, taken from the report summarizes their data. For relative humidity of 10% or less, there is no appreciable effect on the carbon dioxide flux. For relative humidities in the range 18–23%, the flux decreased 30% compared to the dry gas flux, but recovered when the feed was switched back to dry gas. For relative humidities of 30% and higher, the flux decline was found to be large, rapid and irreversible.

Example 10

Figure 4:
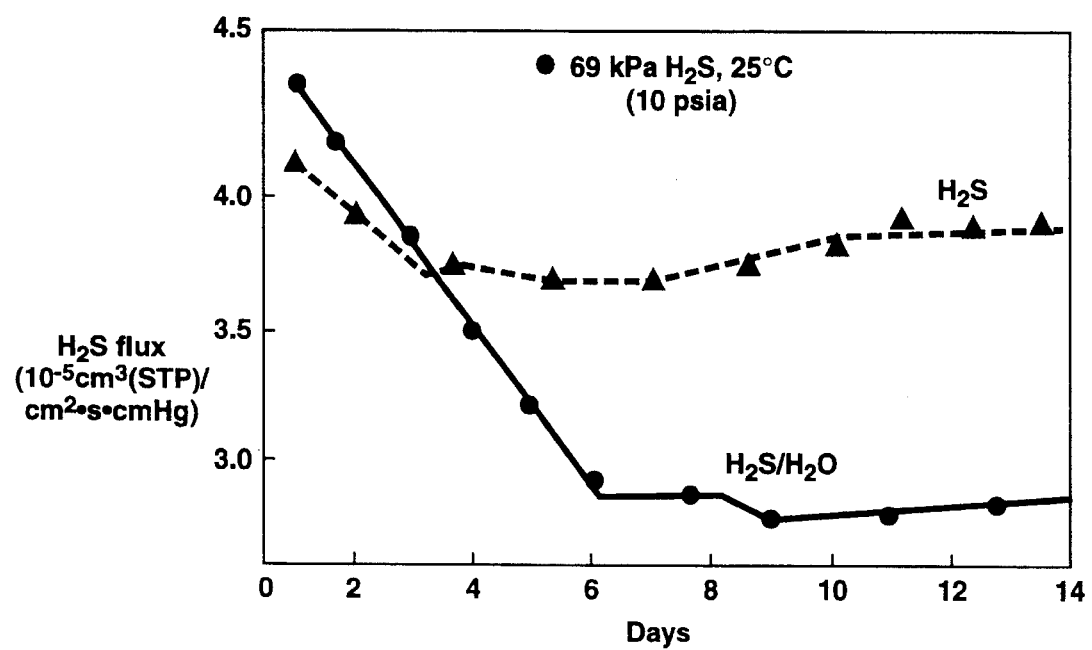
FIG. 4 is a graph showing the effects of hydrogen sulfide and water vapor on the performance of cellulose acetate membranes.

Behavior of Cellulose Acetate Membranes in the Presence of Hydrogen Sulfide and Water Vapor This example is also taken from the Li et al. report. FIG. 4 summarizes the data. Hydrogen sulfide has a negligible effect on membrane performance if the feed gas is dry. If both hydrogen sulfide and water vapor are present, however, the transmembrane flux is substantially reduced. Li et al. conclude that the processing of streams containing both high concentrations of hydrogen sulfide and water vapor must be avoided with cellulose acetate membranes.

Set 2

Examples 11 and 12 show the performance of polyamide-polyether membranes exposed to pure gases. These examples are from earlier work at Membrane Technology and Research, as already reported in U.S. Pat. No. 4,963,165, since we were not able to make measurements with pure hydrogen sulfide.

Example 11

Polyamide-Polyether Membranes. Pure Gas Data

A multilayer composite membrane was prepared by coating a polysulfone support membrane first with a thin high-flux, sealing layer, then with a 1 wt % solution of Pebax grade 4011 in i-butanol. The membrane was tested with pure gases at a temperature of 20° C. and a feed pressure of 50 psig. The results are shown in Table 4.

Example 12

Polyamide-Polyether membranes. Pure Gas Data

A second membrane was prepared using the same materials and technique as in Example 11. The results of pure gas tests with this membrane are also shown in Table 4. There is good agreement between the sets of results from Examples 11 and 12.

TABLE 4

Permeation Properties of Pebax 4011 Composite Membranes Tested with Pure Gases

| Ex. # | Feed Pressure (psig) | Pressure Normalized Flux × $10^{-6}$ [cm$^3$(STP)/(cm$^2$·s·cmHg)] | | | Membrane Selectivity | | |
|---|---|---|---|---|---|---|---|
| | | $H_2S$ | $CO_2$ | $CH_4$ | $H_2S/CH_4$ | $CO_2/CH_4$ | $H_2S/CO_2$ |
| 11 | 50 | 1,650 | 219 | 11.9 | 139 | 18 | 7.5 |
| 12 | 50 | 1,750 | 185 | 9.19 | 190 | 20 | 9.5 |

Examples 13–18 show the performance of polyamide-polyether membranes exposed to gas mixtures under a variety of conditions.

Example 13

A composite membrane was prepared by coating a layer of a polyamide-polyether copolymer (Pebax grade 4011) onto a polyvinylidene fluoride (PVDF) support membrane using the same general techniques as in Example 11. The membrane was tested with a two-component gas mixture containing 4 vol % carbon dioxide, 96 vol % methane at three different feed pressures: 392, 589, and 960 psig. In all cases the permeate side of the membrane was at, or close to, atmospheric pressure and the membrane was at room temperature (23° C.). The permeation result are listed in Table 5.

Example 14

The same type of membrane as in Example 13 was prepared and tested with a two-component gas mixture consisting of 970 ppm hydrogen sulfide, 99.9 vol % methane at three different feed pressures: 386, 589, and 970 psig. In all cases the permeate side of the membrane was at, or close to, atmospheric pressure and the membrane was at room temperature (23° C.). The permeation results are listed in Table 5.

Example 15

The same type of membrane as in Example 13 was prepared and tested with a three-component gas mixture consisting of 870 ppm hydrogen sulfide, 4.12 vol % carbon dioxide and 95.79 vol % methane at three different feed pressure: 386, 589, and 974 psig. In all cases the permeate side of the membrane was at, or close to, atmospheric pressure and the membrane was at room temperature (23° C.). The permeation results are listed in Table 5.

Example 16

The same type of membrane as in Example 13 was prepared and tested with a three-component gas mixture consisting of 0.986 vol % hydrogen sulfide, 4.12 vol % carbon dioxide and 94.90 vol % methane at three different feed pressures: 389, 586, and 971 psig. In all cases the permeate side of the membrane was at, or close to, atmospheric pressure and the membrane was at room temperature (23° C.). The permeation results are listed in Table 5.

Example 17

The same type of membrane as in Example 13 was prepared and tested with a three-component gas mixture consisting of 1.83 vol % hydrogen sulfide, 10.8 vol % carbon dioxide and 87.34 vol % methane at a feed pressure of 965 psig. The permeate side of the membrane was at, or close to, atmospheric pressure and the membrane was at room temperature (23° C.). The permeation results are listed in Table 5.

Example 18

The same type of membrane as in Example 13 was prepared and tested with a three-component gas mixture consisting of 950 ppm hydrogen sulfide, 8.14 vol % carbon dioxide and 91.77 vol % methane at three different feed pressures: 391, 585, and 970 psig. In all cases the permeate side of the membrane was at, or close to, atmospheric pressure and the membrane was at room temperature (23° C.). The permeation results are listed in Table 5.

TABLE 5

Permeation Properties of a Pebax ® 4011 Composite Membrane with Various Feed Gas Compositions at Three Feed Pressures

| Ex. # | Feed Pressure (psig) | Pressure Normalized Flux × $10^{-6}$ [$cm^3$(STP)/($cm^2$.s.cmHg)] | | | Membrane Selectivity | | |
|---|---|---|---|---|---|---|---|
| | | $H_2S$ | $CO_2$ | $CH_4$ | $H_2S/CH_4$ | $CO_2/CH_4$ | $H_2S/CO_2$ |
| 13 | — | 31 | 1.9 | — | 17 | 18 | — |
| | 589 | — | 30 | 1.9 | — | 16 | — |
| | 960 | — | 29 | 2.0 | — | 15 | — |
| 14 | 388 | 91 | — | 1.8 | 51 | — | — |
| | 588 | 74 | — | 1.8 | 41 | — | — |
| | 970 | 73 | — | 1.8 | 41 | — | — |
| 15 | 386 | 140 | 31 | 1.9 | 70 | 16 | 4.5 |
| | 589 | 115 | 30 | 2.0 | 56 | 15 | 3.8 |
| | 974 | 110 | 29 | 2.2 | 52 | 14 | 3.8 |
| 16 | 389 | 113 | 32 | 2.0 | 55 | 16 | 3.5 |
| | 586 | 103 | 31 | 2.0 | 51 | 15 | 3.3 |
| | 971 | 97 | 29 | 2.0 | 48 | 14 | 3.3 |
| 17 | 965 | 121 | 34 | 2.4 | 50 | 14 | 3.6 |
| 18 | 391 | 93 | 26 | 1.6 | 58 | 16 | 3.6 |
| | 585 | 108 | 32 | 2.0 | 52 | 15 | 3.4 |
| | 970 | 93 | 28 | 1.9 | 48 | 14 | 3.3 |

The following observations can be made from the data of Examples 13–18:

1. The presence of carbon dioxide in the feed gas appears to increase the fluxes of both hydrogen sulfide and methane through the membrane. For example, a comparison of the results of Example 14, in which the feed mixture did not contain any carbon dioxide, with those of Examples 15–18, shows that the hydrogen sulfide fluxes are about 25% lower and the methane fluxes are about 15% lower in Example 14. The increased flux may be due to swelling of the membrane by dissolved carbon dioxide.

2. In general, the pressure-normalized fluxes of hydrogen sulfide and carbon dioxide decrease with increasing feed pressure, whereas those of methane increase. The decrease in the hydrogen sulfide and carbon dioxide fluxes may be due to competitive sorption, which results in a lower solubility coefficient (the ratio of concentration in the polymer to partial pressure) for each component. At the same time, the polymer swells, resulting in a higher diffusivity for all components, including methane. The net result is an increase in the methane flux and a decrease in the fluxes of the acid gases (hydrogen sulfide and carbon dioxide).

3. The hydrogen sulfide/methane selectivity for three-component mixtures varies from a low of 48 to a high of 70, although all of the measurements were made at fairly high feed pressures. The carbon dioxide/methane selectivity, also at high pressure, is about 14–16. The selectivities for hydrogen sulfide/methane, carbon dioxide/methane, and hydrogen sulfide/carbon dioxide are all better at the lower end of the pressure range.

Example 19
Gas Streams Containing Water Vapor

The experiments of Example 15 were repeated using feed gas streams saturated with water vapor by bubbling the feed gas through a water reservoir. The experiments were carried out at feed pressures of 387, 588, and 970 psig. The permeate side of the membrane was at, or close to, atmospheric pressure and the membrane was at room temperature (23° C.). The permeation results are listed in Table 6.

TABLE 6

Permeation Properties of Pebax 4011 Composite Membranes Tested with Water-Saturated Gas Mixtures

| Feed Pressure (psig) | Pressure Normalized Flux × $10^{-6}$ [cm$^3$(STP)/ (cm$^2$.s.cmHg)] | | | Membrane Selectivity | | |
|---|---|---|---|---|---|---|
| | $H_2S$ | $CO_2$ | $CH_4$ | $H_2S/CH_4$ | $CO_2/CH_4$ | $H_2S/CO_2$ |
| 387 | 77 | 18.9 | 1.03 | 74.9 | 18.4 | 4.1 |
| 588 | 73.5 | 20.1 | 1.2 | 61.4 | 16.9 | 3.7 |
| 970 | 68.6 | 18.1 | 1.17 | 58.8 | 15.5 | 3.8 |

Comparing these results with those of Table 5, it can be seen that the fluxes are considerably lower (about 40–45% lower) than those obtained in the absence of water vapor. The hydrogen sulfide/carbon dioxide selectivity, however, does not change significantly. Furthermore, when the membranes were retested with a dry gas stream, the fluxes returned to the original values.

Set 3

Examples 20–23 are calculations of the performance of the intermediate membrane fractionation step in embodiments of the process in which the first acid gas removal step is performed by a sorption process of some kind, so that the feed to the membrane fractionation step contains only hydrogen sulfide and carbon dioxide.

Example 20

A calculation was performed on the assumption that the feed to the intermediate fractionation step contains 5 vol % hydrogen sulfide and 95 vol % carbon dioxide at a feed pressure of 200 psia and has a flow rate of 1,000 scfm. The membrane configuration was assumed to be a simple one-stage arrangement as shown in FIG. 2, where numeral 1 indicates the bank of membrane modules and numerals 2, 3, and 4 indicate the acid gas feed stream, the carbon-dioxide-containing residue gas stream, and the hydrogen-sulfide-enriched permeate stream, respectively. The process performance, assuming membranes of various flux and selectivity, is indicated in Table 7.

To meet the lowest target value of hydrogen sulfide content, using a one-stage system, a membrane selectivity of 7 or above is required.

Example 21

A calculation was performed, again on the assumption that the feed to the intermediate fractionation step contains 5 vol % hydrogen sulfide and 95 vol % carbon dioxide at a feed pressure of 200 psia and has a flow rate of 1,000 scfm. The membrane configuration was assumed to be a two-stage arrangement in which the permeate from the first bank of membrane modules becomes the feed for the second bank. A basic schematic of the process is shown in FIG. 5, where numeral 10 indicates the first stage bank of membrane modules and numeral 18 indicates the second stage bank of membrane modules. The incoming gas stream 9 is compressed to 200 psia by a first compressor (not shown), and is mixed with the residue stream 20 from the second stage to form the feed gas stream 21 to the first membrane stage. The permeate stream 12 from the first stage is recompressed to 200 psia in compressor 13. The compressed stream 14 passes to chiller 15, where any water vapor present in the feed gas and enriched in the permeate is condensed and water is removed as liquid stream 16. The non-condensed stream 17 enters the second membrane stage 18, where further separation of hydrogen sulfide takes place. Both membrane stages were assumed to use hydrogen-sulfide-selective membranes.

In this case, the calculations were performed to compare the membrane area and compressor horsepower required to raise the hydrogen sulfide concentration of the second-stage permeate, 19, to 15 vol % and simultaneously reduce hydrogen sulfide residue content, 11, from the first stage to no greater than 0.2 vol %, assuming membranes of various flux and selectivity. The results are shown in Table 8.

TABLE 7

| Pressure-Normalized Flux × $10^{-6}$ cm$^3$(STP)/cm$^2$.s.cmHg | | $H_2S/CO_2$ Selectivity | Membrane Area (m$^2$) | Permeate $H_2S$ Concentration (vol %) | Residue $H_2S$ Concentration (vol %) |
|---|---|---|---|---|---|
| $H_2S$ | $CO_2$ | | | | |
| 40 | 20 | 2 | 2,290 | 5.2 | 0.2 |
| 60 | 20 | 3 | 2,020 | 5.8 | 0.2 |
| 80 | 20 | 4 | 1,780 | 6.5 | 0.2 |
| 140 | 20 | 7 | 1,320 | 8.5 | 0.2 |
| 200 | 20 | 10 | 1,100 | 10.0 | 0.2 |

TABLE 8

| Pressure-Normalized Flux × $10^{-6}$ cm³(STP)/cm².s.cmHg | | $H_2S/CO_2$ Selectivity | First Stage Membrane Area (m²) | Second Stage Membrane Area (m²) | Compressor (hp)* |
|---|---|---|---|---|---|
| $H_2S$ | $CO_2$ | | | | |
| 60 | 20 | 3 | 11,300 | 720 | 1,718 |
| 80 | 20 | 4 | 4,800 | 710 | 729 |
| 140 | 20 | 7 | 1,865 | 700 | 287 |
| 200 | 20 | 10 | 1,340 | 690 | 209 |

*compressor efficiency assumed to be 66%

These results show that the two-stage design is able to achieve the target separation with even relatively moderately selective membranes having a selectivity of 3. However, the size of the compressor required and the membrane area necessary to perform the separation decrease significantly as the selectivity increases to 4 or 7 or more.

Example 22

The two-stage system shown in FIG. 5 is applicable to many acid gas streams but requires high selectivity membranes if good fractionation of the hydrogen sulfide from a stream containing a low concentration of hydrogen sulfide is to be obtained. To process this type of low concentration stream, a two-and-one-half stage design, wherein the residue from the second-stage bank of modules becomes the feed for a half-stage bank, is preferred. This type of design is shown in FIG. 8.

A calculation was performed on the assumption that the feed to the intermediate fractionation step contains 1 vol % hydrogen sulfide and the remainder carbon dioxide at a feed pressure of 200 psia and has a flow rate of 1,000 scfm. The permeate from the first bank of membrane modules, represented by numeral 38, becomes the feed to the second bank, represented by numeral 44. The incoming gas stream 36 is mixed with the residue stream 49 from module(s) 47 to form the feed gas stream 37 to the first membrane stage. The permeate stream, 40, from the first stage is recompressed by compressor 42. Compressor 42 drives two membrane units, the second stage unit, 44, and an auxiliary module or set of modules, 47, that are connected on the permeate side either directly to indirectly to the inlet side of the compressor, so as to form a loop. Thus, permeate stream 48 may be merged with permeate stream 40 to form combined stream 41. The recompressed combined stream, 43, passes to membrane unit 44, and the residue stream, 46, from membrane unit 44 passes as feed to membrane unit 47. The size of the membrane banks is chosen to produce a carbon-dioxide-rich residue stream, 39, containing 0.2 vol % hydrogen sulfide, and a hydrogen-sulfide-rich permeate stream, 45, containing 15 vol % hydrogen sulfide. The size of the membrane system and the compressor horsepower required for membranes of varying selectivity are shown in Table 9. As before, the system becomes considerably smaller and more efficient as the membrane selectivity increases, but even a selectivity of 3 or 4 can meet the target compositions for the hydrogen-sulfide-rich and carbon-dioxide-rich fractions.

TABLE 9

| Pressure-Normalized Flux × $10^{-6}$ cm³(STP)/cm².s.cmHg | | $H_2S/CO_2$ Selectivity | First Stage Membrane Area (m²) | Second Stage Membrane Area (m²) | Half Stage Membrane Area (m²) | Compressor (hp)* |
|---|---|---|---|---|---|---|
| $H_2S$ | $CO_2$ | | | | | |
| 60 | 20 | 3 | 3,960 | 120 | 8,230 | 1,845 |
| 80 | 20 | 4 | 2,400 | 118 | 2,340 | 712 |
| 200 | 20 | 10 | 876 | 115 | 105 | 147 |

*compressor efficiency assumed to be 66%

Example 23

A calculation was performed on the assumption that the feed to the intermediate fractionation step contains 5 vol % hydrogen sulfide and the remainder carbon dioxide, and has a flow rate of 1,000 scfm. The membrane configuration was assumed to be a two-step design, wherein the residue from the first bank of modules becomes the feed to the second bank of modules, as shown in FIG. 6. The acid gas stream, 22, is compressed to 200 psia by a compressor (not shown), and then passed through a first bank of membrane modules, 23. The permeate, 25, from this operation is the hydrogen-sulfide-rich fraction. The residue stream, 24, still containing hydrogen sulfide, is sent to a second membrane operation, 26, which performs a further separation. The residue, 27, from this operation is the carbon-dioxide-rich fraction. The permeate, 28, from the second step is recirculated to the feed side of the first membrane bank. The size of the membrane system and the compressor horsepower required for membranes of varying selectivity are shown in Table 10. As before, the system becomes considerably smaller and more efficient as the membrane selectivity increases, but even a selectivity of 3 or 4 can meet the target compositions for the hydrogen-sulfide-rich and carbon-dioxide-rich fractions.

TABLE 10

| Pressure-Normalized Flux × $10^{-6}$ cm$^3$(STP)/cm$^2$·s·cmHg | | H$_2$S/CO$_2$ Selectivity | First Step Membrane Area (m$^2$) | Second Step Membrane Area (m$^2$) | Compressor (hp)* |
|---|---|---|---|---|---|
| H$_2$S | CO$_2$ | | | | |
| 60 | 20 | 3 | 721 | 11,600 | 2,152 |
| 80 | 20 | 4 | 710 | 4,792 | 1,097 |
| 140 | 20 | 7 | 697 | 1,423 | 578 |
| 200 | 20 | 10 | 692 | 742 | 475 |

*compressor efficiency assumed to be 66%

Set 4

Examples 24–30 are calculations of the performance of the intermediate fractionation step in embodiments of the process in which the first acid gas removal step is performed by a membrane operation, so that the feed to the membrane fractionation step still contains some methane.

Example 24

A process was designed to handle a primary 1,000 scfm gas stream containing 1,000 ppm hydrogen sulfide, 4 vol % carbon dioxide and the remainder methane. The process uses a membrane operation for the first acid gas separation step, followed by the intermediate membrane fractionation step.

First Step

The first step uses a two-stage membrane separation system in which the permeate from the first bank of membrane modules becomes the feed for the second bank. The process schematic is as shown in FIG. 5, except that no condenser 15 is used. Numeral 10 indicates the first stage bank of membrane modules and numeral 18 indicates the second stage bank of membrane modules. The incoming gas stream 9 is at 1,000 psia and is mixed with the residue stream 20 from the second stage to form the feed gas stream 21 to the first membrane stage. In this case, the permeate stream 12 from the first stage is recompressed to 1,000 psia in compressor 13, then passed without any condensation taking place as compressed stream 17 to the second membrane stage 18, where further separation of hydrogen sulfide takes place. The residue stream from this stage is recirculated within the process. Both membrane stages were assumed to use more hydrogen-sulfide-selective membranes having the following characteristics:

Hydrogen sulfide/methane selectivity: 50

Carbon dioxide/methane selectivity: 13

Methane flux: $7.5 \times 10^{-6}$ cm$^3$(STP)/cm·s·cmHg

The compositions of the first and second stage permeate and residue streams were calculated and are given in Table 11.

TABLE 11

| STREAM | FEED | RESIDUE | PERMEATE |
|---|---|---|---|
| FIRST STAGE | | | |
| Flow rate (scfm) | 1,220 | 964 | 256 |
| CH$_4$ conc. (vol %) | 93.0 | 98.86 | 71.8 |
| CO$_2$ conc. (vol %) | 6.9 | 1.14 | 28.3 |
| H$_2$S conc. (ppm) | 1,000 | 4 | 4,733 |
| SECOND STAGE | | | |
| Flow rate (scfm) | 256 | 220 | 36 |
| CH$_4$ conc. (vol %) | 71.8 | 80.0 | 19.6 |
| CO$_2$ conc. (vol %) | 28.3 | 19.9 | 77.7 |
| H$_2$S conc. (vol %) | 0.47 | 0.1 | 2.7 |

The membrane area used to perform such a separation was calculated to be about 244 m$^2$ total, 232 m$^2$ in the first stage and 12 m$^2$ in the second stage. The residue stream 11 from the first stage meets pipeline specifications. The overall methane loss into the second stage permeate is very low, at about 0.7 vol %. The second stage permeate contains 2.7 vol % hydrogen sulfide and 19.6 vol % methane.

Second Step

The intermediate membrane fractionation step uses a two-step membrane process as shown in FIG. 6 and described in detail in Example 23. The hydrogen-sulfide-selective membrane used for the separation was assumed to have the following characteristics:

Hydrogen sulfide/methane selectivity: 50

Carbon dioxide/methane selectivity: 13

Hydrogen sulfide/carbon dioxide selectivity: 3.8

Carbon dioxide flux: $1 \times 10^{-4}$ cm$^3$(STP)/cm$^2$·s·cmHg

The feed to the fractionation step was assumed to be recompressed to 200 psia by a compressor, not shown in FIG. 6. The overall results of the two-step fractionation are given in Table 12.

TABLE 12

| | Concentration (vol %) | | |
|---|---|---|---|
| Stream | H$_2$S | CO$_2$ | CH$_4$ |
| Acid Gas Feed | 2.7 | 77.7 | 19.6 |
| Carbon Dioxide/Methane Residue | 0.2 | 76.3 | 23.5 |
| Hydrogen Sulfide Concentrate | 15.0 | 84.5 | 0.5 |

Area of First Membrane Step: 2.8 m$^2$
Area of Second Membrane Step: 44 m$^2$
Compressor hp (66% efficiency): 43.6

The carbon-dioxide-rich residue gas can be flared or reinjected. The hydrogen-sulfide-rich stream is now sufficiently concentrated in hydrogen sulfide and depleted of methane for treatment in a Claus plant.

Example 25

A process was designed to handle a primary 1,000 scfm gas stream containing 1,000 ppm hydrogen sulfide, 15 vol % carbon dioxide and the remainder methane, a composition that falls in Zone D of FIG. x, but close to the boundary of Zone B. The process uses a membrane operation for the first acid gas separation step, followed by the intermediate membrane fractionation step.

First Step

Figure 7:
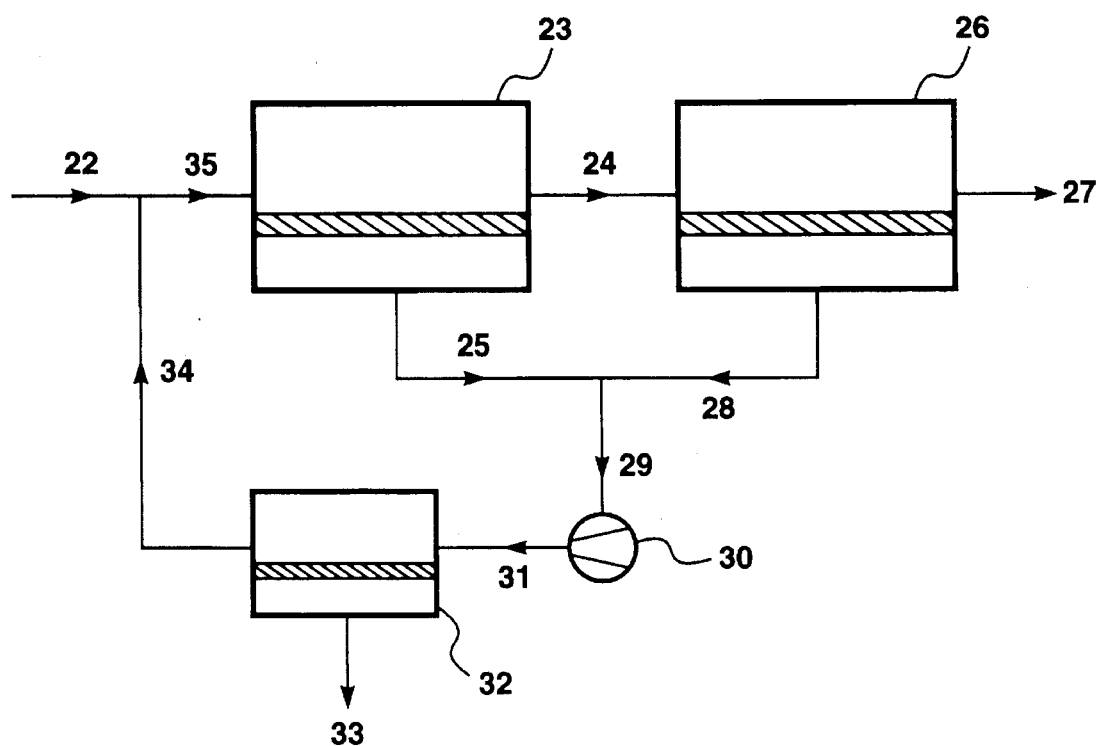
FIG. 7 is a basic schematic drawing of a two-step/two-stage membrane separation process.
Figure 8:
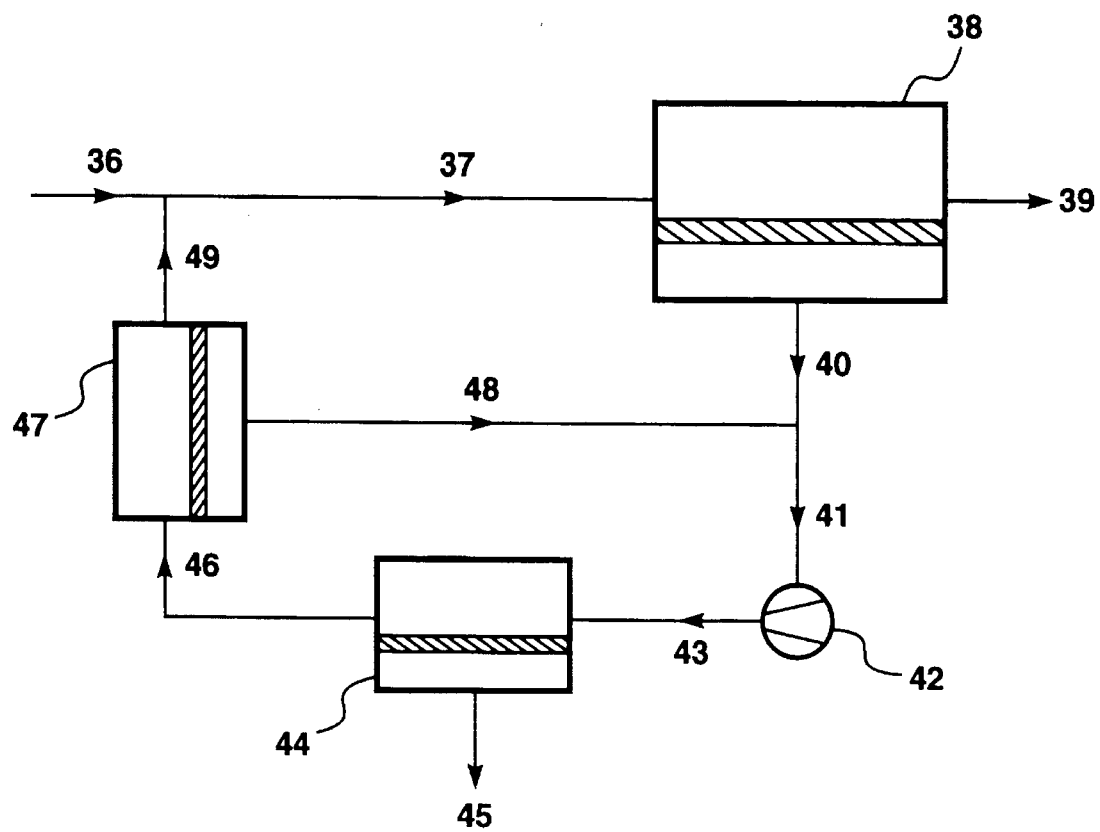
FIG. 8 is a basic schematic drawing of a two-stage membrane separation process with an auxiliary membrane unit forming a second-stage loop.

The first step uses a membrane separation system as shown in FIG. 7. Numerals 23, 26 and 32 indicate the three banks of membrane modules; 23 and 32 contain the more hydrogen-sulfide-selective membrane; 26 contains the more carbon-dioxide-selective membrane. The incoming gas stream 22 is at 1,000 psia, and is mixed with the residue stream 34 from the second stage to form the feed gas stream 35 to the first membrane stage. The residue stream, 24, from the first bank of modules passes as feed to the second bank of the first stage, 26. Permeate streams 25 and 28 are combined to form stream 29, which is recompressed by compressor 30, and becomes the feed, 31, to the third bank of membrane modules. It will be apparent to those of ordinary skill in the art that two separate compressors could be used and the stream combined after compression. Also, in cases where the stream to be treated contains water vapor, the system could include a condenser, as in FIG. 5, to condense permeating water vapor. The characteristics of the two types of membrane were assumed to be as follows:

More hydrogen-sulfide-selective membrane:

Hydrogen sulfide/methane selectivity: 50

Carbon dioxide/methane selectivity: 13

Methane flux: $7.5 \times 10^{-6}$ $cm^3(STP)/cm^2 \cdot s \cdot cmHg$

More carbon-dioxide-selective membrane:

Hydrogen sulfide/methane selectivity: 25

Carbon dioxide/methane selectivity: 20

Methane flux: $7.5 \times 10^{-6}$ $cm^3(STP)/cm^2 \cdot s \cdot cmHg$

The compositions of the various streams were calculated and are given in Table 13.

TABLE 13

| Stream # | CH₄ conc. | H₂S conc. (ppm) | CO₂ conc. (vol %) |
| --- | --- | --- | --- |
| 22 | 84.9 | 1,000 | 15.0 |
| 35 | 63.9 | 1,000 | 36.0 |
| 24 | 79.7 | 70 | 20.3 |
| 27 | 98.0 | 4 | 2.0 |
| 25 | 17.0 | 3,770 | 82.7 |
| 28 | 37.4 | 221 | 62.6 |
| 31 | 26.6 | 2,084 | 73.2 |
| 33 | 3.1 | 7,390 | 96.2 |
| 34 | 31.5 | 1,000 | 68.4 |

The membrane areas required were as follows: 119 m² for membrane 23, 188 m² for membrane 26 and 17 m² for membrane 32. The residue stream 27 from the first stage meets pipeline specifications. The permeate stream 33 from the second stage contains about 0.7 vol % hydrogen sulfide and the overall methane loss is about 0.4 vol %.

Second Step

The feed to the fractionation step was assumed to be recompressed to 200 psia by a compressor, not shown in the figure. Otherwise, the design for the fractionation step is the "two-and-a-half-stage" design, illustrated in FIG. 8 and described in detail in Example 22. All membranes are assumed to be hydrogen-sulfide-selective with the following characteristics:

Hydrogen sulfide flux: $375 \times 10^{-6}$ $cm^3(STP)/cm^2 \cdot s \cdot cmHg$, Carbon dioxide flux: $137 \times 10^{-6}$ $cm^3(STP)/cm^2 \cdot s \cdot cmHg$, and Methane flux: $7.5 \times 10^{-6}$ $cm^3(STP)/cm^2 \cdot s \cdot cmHg$.

The overall results of the two-stage fractionation are shown in Table 14.

TABLE 14

| | Concentration (vol %) | | |
| --- | --- | --- | --- |
| Stream | H₂S | CO₂ | CH₄ |
| Acid Gas Feed to Unit | 0.7 | 96.2 | 3. |
| Hydrogen Sulfide Concentrate (to Claus Plant) | 15.0 | 85.0 | 0.01 |
| Carbon Dioxide Concentrate (to Flare) | 0.1 | 96.7 | 3.2 |
| Area of First Stage Membrane: 99 m² | | | |
| Area of Second Stage Membrane: 3.1 m² | | | |
| Area of Half-Stage Membrane: 187 m² | | | |
| Compressor hp (66% efficiency): 383 hp | | | |

Example 26

A process was designed to handle a gas stream containing 1,000 ppm hydrogen sulfide, 0.1 vol % water vapor, 4 vol % carbon dioxide and the remainder methane, at a feed pressure of 1,000 psia. The process uses a membrane operation for the first acid gas separation step, followed by the intermediate membrane fractionation step.

First Step

The first step includes a one-stage membrane separation step, as shown in FIG. 2 and described in Example 20, followed by a scavenging step to bring the hydrogen sulfide concentration down further to 4 ppm. The scavenging step could be carried out using an iron sponge, for example. The process was assumed to use one bank of more hydrogen-sulfide-selective membranes having the following characteristics:

Hydrogen sulfide/methane selectivity: 80

Water vapor/methane selectivity: 1,000

Carbon dioxide/methane selectivity: 12

Methane flux: $1 \times 10^{-6}$ $cm^3(STP)/cm^2 \cdot s \cdot cmHg$

The compositions and flow rates of the permeate and residue streams were calculated and are given in Table 15.

TABLE 15

| STREAM | FEED | RESIDUE | PERMEATE |
| --- | --- | --- | --- |
| Flow rate (psia) | 100 | 90.3 | 9.7 |
| CH₄ conc. (vol %) | 95.8 | 98 | 74.9 |
| CO₂ conc. (vol %) | 4.0 | 1.9 | 23.1 |
| H₂S conc. (ppm) | 1,000 | 40 | 9,900 |
| Water vapor conc. (vol %) | 0.1 | 2 ppm | 1.0 |

The membrane area used was calculated to be about 70 m². The stage cut was just under 10% and the methane loss into the permeate was 7.6 vol %. The process produces a residue stream that meets pipeline specification for carbon dioxide and water vapor, but needs further polishing to remove hydrogen sulfide. The hydrogen sulfide permeate stream contains approximately 1.0 vol % hydrogen sulfide and 75.7 vol % methane on a dry basis (after the water vapor has been condensed).

Second Step

Three designs for the intermediate fractionation step were considered: a two-stage design, shown in FIG. 5 and described in detail in Example 21; a two-step design, shown in FIG. 6 and described in detail in Example 23; and a two-and-a-half-stage design, shown in FIG. 8 and described in detail in Example 22. In all cases, the feed to the fractionation step was assumed to be compressed to 200 psia by a compressor (not shown). For each design, the membranes were assumed to have the following characteristics:

Hydrogen sulfide flux: $375 \times 10^{-6}$ $cm^3(STP)/cm^2 \cdot s \cdot cmHg$, Carbon dioxide flux: $102 \times 10^{-6}$ $cm^3(STP)/cm^2 \cdot s \cdot cmHg$ Methane flux: $7.5 \times 10^{-6}$ $cm^3(STP)/cm^2 \cdot s \cdot cmHg$.

The results of calculations for all these designs are shown in Table 16,

TABLE 16

| | Concentration (vol %) | | |
| --- | --- | --- | --- |
| Stream | H₂S | CO₂ | CH₄ |
| Two-Step Process | | | |
| Feed | 1.0 | 23.3 | 75.7 |
| Residue | 0.2 | 20.2 | 79.6 |
| Permeate | 15.0 | 77.6 | 7.4 |
| Compressor hp (66% efficiency): 5.8 | | | |
| Total Membrane Area: 9.0 m² | | | |

TABLE 16-continued

| Stream | Concentration (vol %) | | |
|---|---|---|---|
| | $H_2S$ | $CO_2$ | $CH_4$ |
| Two-Stage Process | | | |
| Feed | 1.0 | 23.3 | 75.7 |
| Residue | 0.2 | 19.9 | 80.0 |
| Permeate | 15.0 | 83.6 | 1.4 |
| Compressor hp (66% efficiency): 6.8 | | | |
| Total Membrane Area: 7.2 m² | | | |
| Two-and-a-Half-Stage Process | | | |
| Feed | 1.0 | 23.3 | 75.7 |
| Residue | 0.2 | 19.8 | 80.0 |
| Permeate | 15.0 | 84.0 | 1.0 |
| Compressor hp (66% efficiency): 6.2 | | | |
| Total Membrane Area: 6.2 m² | | | |

All designs achieve a hydrogen sulfide concentration of 15 vol % in the stream to be passed to the Claus plant. The two-step system has the lowest horsepower requirement, but the permeate still contains 7.4 vol % methane, and this design uses almost 30% more membrane area than the multi-stage designs. Both the two-stage and the two-and-a-half-stage arrangements can meet the <5 vol % methane target. The two-and-a-half-stage unit has a slightly lower membrane area and horsepower requirement, and is the preferred design.

Example 27

A process was designed to handle a primary 1,000 scfm gas stream containing 0.5 vol % hydrogen sulfide, 20 vol % carbon dioxide and the remainder methane, at a feed pressure of 1,000 psia. The process includes a membrane separation step followed by amine absorption for further hydrogen sulfide removal for the first step, followed by an intermediate membrane fractionation step.

First Step

The process uses a one-stage membrane separation step, as shown in FIG. 2 and described in Example 20, to carry out a first separation of carbon dioxide and hydrogen sulfide, followed by amine absorption to bring the stream to pipeline specification. The process was assumed to use one bank of more hydrogen-sulfide-selective membranes having the following characteristics:

Hydrogen sulfide/methane selectivity: 50

Carbon dioxide/methane selectivity: 13

Methane flux: $7.5 \times 10^{-6}$ cm³(STP)/cm²·s·cmHg

The compositions and flow rates of the permeate and residue streams were calculated and are given in Table 17.

TABLE 17

| STREAM | FEED | RESIDUE | PERMEATE |
|---|---|---|---|
| Flow rate (scfm) | 1,000 | 840 | 160 |
| $CH_4$ conc. (vol %) | 79.5 | 88.8 | 30 |
| $CO_2$ conc. (vol %) | 20 | 11.1 | 67 |
| $H_2S$ conc. (vol %) | 0.5 | 0.05 | 2.9 |

The membrane area used was calculated to be about 70 m². The stage cut was just under 16% and the methane loss into the permeate was 6 vol %. The process produces a residue stream from which 90% of the hydrogen sulfide and about 50% of the carbon dioxide has been removed. This residue stream could be passed to an amine plant for additional treatment to bring it within specification for carbon dioxide and hydrogen sulfide.

Second Step

The intermediate membrane fractionation step uses a two-step membrane process as shown in FIG. 6 and described in detail in Example 22. Both steps of the process are equipped with hydrogen-sulfide-selective membranes having the following characteristics:

Hydrogen sulfide/methane selectivity: 50

Carbon dioxide/methane selectivity: 13

Hydrogen sulfide/carbon dioxide selectivity: 3.8

Carbon dioxide flux: $1 \times 10^{-4}$ cm³(STP)/cm²·s·cmHg

The feed to the fractionation step was assumed to be compressed to 200 psia by a compressor (not shown in FIG. 6). The overall results of the two-step fractionation are given in Table 18.

TABLE 18

| Stream | Concentration (vol %) | | |
|---|---|---|---|
| | $H_2S$ | $CO_2$ | $CH_4$ |
| Acid Gas Feed | 2.9 | 67.0 | 30.1 |
| Carbon Dioxide/Methane Residue | 0.2 | 63.2 | 36.6 |
| Hydrogen Sulfide Concentrate | 15.0 | 84.0 | 1.0 |
| Area of First Membrane Step: 14 m² | | | |
| Area of Second Membrane Step: 168 m² | | | |
| Compressor hp (66% efficiency): 163 | | | |

Example 28

A process was designed to handle a 1,000 scfm gas stream containing 1,000 ppm hydrogen sulfide, 1,200 ppm water vapor, 10 vol % carbon dioxide and the remainder methane. The process uses a membrane operation followed by amine absorption for the first acid gas separation step, followed by an intermediate membrane fractionation step.

First Step

The process uses a membrane separation system as shown in FIG. 8. Numerals 38, 44 and 47 indicate the three banks of membrane modules: all contain the more hydrogen-sulfide-selective membrane. The incoming gas stream 36 is at 1,000 psia and is mixed with the residue stream 49 from module(s) 47 to form the feed gas stream 37 to the first membrane stage. The permeate stream, 40, from the first stage is recompressed in compressor 42. Compressor 42 drives two membrane units, the second stage unit, 44, and an auxiliary module or set of modules, 47, that are connected on the permeate side either directly or indirectly to the inlet side of the compressor, so as to form a loop. Thus, permeate stream 48 may be merged with permeate stream 40 to form combined stream 41. The recompressed, combined stream, 43, passes as feed to membrane unit 44, and the residue stream, 46, from membrane unit 44 passes as feed to membrane unit 47. Permeate is withdrawn from the loop as stream 45 and the treated residue exits as stream 39.

The characteristics of the membrane were assumed to be as follows:

Hydrogen sulfide/methane selectivity: 50

Carbon dioxide/methane selectivity: 15

Water vapor/methane selectivity: 500

Methane flux: $7.5 \times 10^{-6}$ cm³(STP)/cm²·s·cmHg

The compositions and flow rates of the product residue (first stage) and product permeate (second stage) streams were calculated and are given, together with the raw (unmixed) feed figures, in Table 19.

TABLE 19

| STREAM | FEED | RESIDUE | PERMEATE |
|---|---|---|---|
| Flow rate (psia) | 1,000 | 983.5 | 16.5 |
| $H_2S$ conc. (ppm) | 1,000 | 400 | 3.7 vol % |
| $CO_2$ conc. (vol %) | 10.0 | 8.7 | 86.9 |
| Water vapor conc. (ppm) | 1,200 | 50 | 6.6 vol % |
| $CH_4$ conc. (vol %) | 89.8 | 91.3 | 2.8 |

The membrane area used to perform such a separation was calculated to be about 36 m² total, 31 m² in the first stage, 2 m² in the second stage and 3 m² in the auxiliary stage. The residue stream could be passed to an amine plant for additional treatment to bring it within specification for carbon dioxide and hydrogen sulfide.

Second Step

The intermediate fractionation step uses either a two-step or a two-stage system design, as shown in FIGS. 6 and 5, respectively. All membrane banks were assumed to contain hydrogen-sulfide-selective membranes having the following characteristics.

Hydrogen sulfide flux: $375\times10^{-6}$ cm³(STP)/cm²·s·cmHg,

Carbon dioxide flux: $102\times10^{-6}$ cm³(STP)/cm²·s·cmHg

Methane flux: $7.5\times10^{-6}$ cm³(STP)/cm²·s·cmHg. The feed to the fractionation step was assumed to be compressed to 200 psia by a compressor, not shown in FIGS. 5 and 6. The overall results of the two-step and the two-stage fractionation are shown in Table 20.

TABLE 20

| Stream | Concentration (vol %) | | |
|---|---|---|---|
|  | $H_2S$ | $CO_2$ | $CH_4$ |
| Two-Step Design | | | |
| Feed (dry basis) | 4.0 | 93.0 | 3.0 |
| Permeate | 15.0 | 85.0 | 0.17 |
| Residue | 0.2 | 95.8 | 4.0 |
| Compressor hp for 200 psia: 23.0 (66% efficiency) | | | |
| Total Membrane Area: 23.8 m² | | | |
| Two-Stage Design | | | |
| Feed (dry basis) | 4.0 | 93.0 | 3.0 |
| Permeate | 15.0 | 85.0 | 0.01 |
| Residue | 0.2 | 95.8 | 4.0 |
| Compressor hp for 200 psia: 36.5 (66% efficiency) | | | |
| Total Membrane Area: 22.7 m² | | | |

Because the feed concentration of hydrogen sulfide is relatively high (4 vol %), the calculations show the two-step design to be favored, because of the smaller compressor load. If the feed concentration were lower, a two-stage or a two-and-a-half-stage design would be preferred.

Example 29

A process was again designed to handle a 1,000 scfm gas stream containing 1,000 ppm hydrogen sulfide, 1,200 ppm water vapor, 10 vol % carbon dioxide and the remainder methane. The process uses a membrane operation followed by amine absorption for the first acid gas separation step, followed by the intermediate membrane fractionation step.

First Step

The first step uses a membrane system as shown in FIG. 8 and previously described in FIG. 22. In this case, however, more membrane area was used and the system was run at a slightly higher stage cut to extract more hydrogen sulfide and carbon dioxide into the permeate stream. The characteristics of the membrane were assumed to be as follows:

Hydrogen sulfide/methane selectivity: 50

Carbon dioxide/methane selectivity: 15

Water vapor/methane selectivity: 500

Methane flux: $7.5\times10^{-6}$ cm³(STP)/cm²·s·cmHg

The compositions and flow rates of the product residue (first stage) and product permeate (second stage) streams were calculated and are given, together with the raw (unmixed) feed figures, in Table 21.

TABLE 21

| STREAM | FEED | RESIDUE | PERMEATE |
|---|---|---|---|
| Flow rate (scfm) | 1,000 | 970 | 30 |
| $H_2S$ conc. (ppm) | 1,000 | 100 | 3.0 vol % |
| $CO_2$ conc. (vol %) | 10.0 | 7.5 | 90.7 |
| Water vapor conc. (ppm) | 1,200 | 0 | 4.0 vol % |
| $CH_4$ conc. (vol %) | 89.8 | 92.5 | 2.3 |

The membrane area used to perform such a separation was calculated to be about 93 m² total, 80 m² in the first stage, 3 m² in the second stage and 10 m² in the auxiliary stage. The residue stream could be passed to an amine plant for additional treatment to bring it within specification for carbon dioxide and hydrogen sulfide.

Second Step

The intermediate fractionation step uses a two-step membrane process as shown in FIG. 6. Both steps of the process use hydrogen-sulfide-selective membranes having the following characteristics:

Hydrogen sulfide/methane selectivity: 50

Carbon dioxide/methane selectivity: 13

Hydrogen sulfide/carbon dioxide selectivity: 3.8

Carbon dioxide flux: $1\times10^{-4}$ cm³(STP)/cm²·s·cmHg

The feed to the fractionation step was assumed to be compressed to 200 psia by a compressor (not shown in FIG. 6). The results of the two-step fractionation step are shown in Table 22.

TABLE 22

| Stream | Concentration (vol %) | | |
|---|---|---|---|
|  | $H_2S$ | $CO_2$ | $CH_4$ |
| Acid Gas Feed (dry basis) | 3.1 | 94.5 | 2.4 |
| Carbon Dioxide/Methane Residue | 0.2 | 96.8 | 3.0 |
| Hydrogen Sulfide Concentrate | 15.0 | 84.9 | 0.1 |
| Area of First Membrane Step: 2.5 m² | | | |
| Area of Second Membrane Step: 42.6 m² | | | |
| Compressor hp (66% efficiency): 44.1 | | | |

Example 30

A process was designed to handle a 1,000 scfm gas stream containing 5,000 ppm hydrogen sulfide, 5 vol % carbon dioxide and the remainder methane. The process uses a membrane separation system followed by an iron sponge for the first step, followed by an intermediate membrane fractionation step.

First Step

The first step uses a two-stage membrane separation system as shown in FIG. 5. Both membrane stages use more hydrogen-sulfide-selective membranes having the following characteristics:

Hydrogen sulfide/methane selectivity: 50

Water vapor/methane selectivity: 500

Carbon dioxide/methane selectivity: 15

Methane flux: $7.5\times10^{-6}$ cm³(STP)/cm²·s·cmHg

The compositions and flow rates of the product residue (first stage) and product permeate (second stage) streams were calculated and are given, together with the raw (unmixed) feed figures, in Table 23.

TABLE 23

| STREAM | FEED | RESIDUE | PERMEATE |
|---|---|---|---|
| Flow rate (scfm) | 1,000 | 954 | 46 |
| $H_2S$ conc. (ppm) | 5,000 | 50 | 10.6 vol % |
| $CO_2$ conc. (vol %) | 5.0 | 1.5 | 76.7 |
| $CH_4$ conc. (vol %) | 94.5 | 98.5 | 12.7 |

The membrane area used to perform such a separation was calculated to be about 192 $m^2$ total, 182 $m^2$ in the first stage and 10 $m^2$ in the second stage. The permeate stream contains 10.6 vol % hydrogen sulfide, a sufficiently high concentration for the Claus process, but 12.7 vol % methane, too high for the Claus process. The residue stream could be passed to an iron sponge for removal of the remainder of the hydrogen sulfide, down to 4 ppm.

Second Step

The intermediate fractionation step uses a one-stage membrane design as shown in FIG. 2. The feed was assumed to be compressed to 200 psia by a 32.7 hp compressor (66% efficiency) (not shown). The hydrogen-sulfide-selective membrane has the following characteristics:

Hydrogen sulfide flux: $375 \times 10^{-6}$ $cm^3(STP)/cm^2 \cdot s \cdot cmHg$

Carbon dioxide flux: $102 \times 10^{-6}$ $cm^3(STP)/cm^2 \cdot s \cdot cmHg$

Methane flux: $7.5 \times 10^{-6}$ $cm^3(STP)/cm^2 \cdot s \cdot cmHg$

The overall results of the fractionation step are shown in Table 24.

TABLE 24

| Stream | Feed | Residue | Permeate |
|---|---|---|---|
| Flow Rate (scfm) | 46 | 13.5 | 32.5 |
| Hydrogen Sulfide concentration (vol %) | 10.6 | 0.2 | 14.8 |
| Carbon Dioxide concentration (vol %) | 76.7 | 60.2 | 83.3 |
| Methane concentration (vol %) | 12.7 | 39.6 | 1.9 |

The residue stream could be used as a low-pressure fuel gas, flared, or reinjected into the formation. The permeate gas, containing 14.8 vol % hydrogen sulfide and 1.9 vol % methane, is suitable for use as a Claus plant feedstock.

Set 5

This example shows that membrane performance achieved with membrane stamps can be maintained in membrane modules.

Example 31

Spiral-wound membrane modules were constructed using a 0.3–0.5 μm-thick Pebax 4011 membrane on a glassy support membrane. The modules were 2.5 inches in diameter and 40 inches long, and contained 0.2 $m^2$ of membrane area.

One module was tested in a high-pressure bench test system with a gas mixture containing 1,000–1,800 ppm hydrogen sulfide, 3.5–4 vol % carbon dioxide, and the balance methane. Table 25 shows the permeation characteristics of the module.

TABLE 25

| Feed Pressure (psia) | Mixed Gas Permeation Flux $\times 10^{-6}$ $cm^3(STP)/cm^2 \cdot s \cdot cmHg$ | | | Module Selectivity | | |
|---|---|---|---|---|---|---|
| | $CH_4$ | $CO_2$ | $H_2S$ | $H_2S/CH_4$ | $CO_2/CH_4$ | $H_2S/CO_2$ |
| 420 | 3.4 | 42 | 181 | 53 | 12.5 | 4.2 |
| 595 | 3.4 | 40 | 167 | 49 | 11.6 | 4.2 |
| 1,000 | 3.4 | 33 | 114 | 33 | 9.6 | 3.4 |

The selectivities obtained are comparable with those obtained from membrane stamps.

We claim:

1. A process for treating a gas stream comprising hydrogen sulfide and carbon dioxide, said process comprising:
   (a) carrying out an acid gas removal step on said gas stream, thereby generating an acid gas stream enriched in said hydrogen sulfide and said carbon dioxide compared with said gas stream;
   (b) carrying out a membrane fractionation step, comprising:
      (i) passing said acid gas stream across the feed side of a fractionation membrane having a feed side and a permeate side;
      (ii) withdrawing from said feed side a residue stream depleted in said hydrogen sulfide compared with said acid gas stream;
      (iii) withdrawing from said permeate side a permeate stream enriched in said hydrogen sulfide compared with said acid gas stream;
   said membrane fractionation step being characterized in that said fractionation membrane exhibits a mixed gas selectivity for said hydrogen sulfide over said carbon dioxide of at least about 3, as measured with mixtures containing at least said hydrogen sulfide and said carbon dioxide and at a feed pressure of at least 200 psig;
   (c) further treating said permeate stream in a sulfur-fixing step.

2. The process of claim 1, wherein said permeate stream contains at least about 4 vol % hydrogen sulfide.

3. The process of claim 1, wherein said permeate stream contains at least about 8 vol % hydrogen sulfide.

4. The process of claim 1, wherein said permeate stream contains at least about 10 vol % hydrogen sulfide.

5. The process of claim 1, wherein said permeate stream contains at least about 15 vol % hydrogen sulfide.

6. The process of claim 1, wherein said permeate stream contains at least about 20 vol % hydrogen sulfide.

7. The process of claim 1, wherein said gas stream further comprises methane, and wherein said permeate stream contains no more than about 5 vol % methane.

8. The process of claim 1, wherein said gas stream further comprises methane, and wherein said permeate stream contains no more than about 3 vol % methane.

9. The process of claim 1, wherein said residue stream contains no more than about 2,000 ppm hydrogen sulfide.

10. The process of claim 1, wherein said residue stream contains no more than about 1,000 ppm hydrogen sulfide.

11. The process of claim 1, wherein said feed pressure is at least 300 psig.

12. The process of claim 1, wherein said feed pressure is at least 400 psig.

13. The process of claim 1, wherein said mixed gas selectivity is at least about 4.

14. The process of claim 1, wherein said mixed gas selectivity is at least about 5.

15. The process of claim 1, wherein said mixed gas selectivity is at least about 7.

16. The process of claim 1, wherein said fractionation membrane comprises a composite membrane having a selective layer comprising a polymer that is rubbery when in use in said process.

17. The process of claim 1, wherein said fractionation membrane comprises a block copolymer containing a polyether block.

18. The process of claim 1, wherein said fractionation membrane comprises a polyamide-polyether block copolymer having the general formula

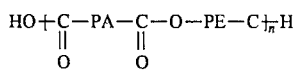

wherein PA is a polyamide group, PE is a polyether group and n is a positive integer.

19. The process of claim 1, wherein said acid gas removal step comprises absorption.

20. The process of claim 1, wherein said acid gas removal step comprises absorption into an amine solution.

21. The process of claim 1, wherein said acid gas removal step comprises absorption into a potassium carbonate solution.

22. The process of claim 1, wherein said acid gas removal step comprises a first membrane separation step.

23. The process of claim 22, wherein said first membrane separation step uses a first membrane that comprises a block copolymer containing a polyether block.

24. The process of claim 22, wherein said first membrane separation step uses a first membrane that comprises cellulose acetate.

25. The process of claim 1, wherein said acid gas removal step comprises a combination of a membrane separation operation and a non-membrane separation operation.

26. The process of claim 1, wherein said sulfur-fixing step comprises a Claus process.

27. The process of claim 1, wherein said sulfur-fixing step comprises a redox process.

28. The process of claim 1, wherein said sulfur-fixing step produces elemental sulfur.

29. The process of claim 1, wherein said sulfur-fixing step produces sulfuric acid.

30. The process of claim 1, wherein said gas stream comprises natural gas.

31. The process of claim 1, wherein said gas stream comprises natural gas, and wherein said acid gas removal step also generates a depleted gas stream depleted in hydrogen sulfide and carbon dioxide compared with said gas stream and said depleted gas stream meets pipeline specifications for carbon dioxide and hydrogen sulfide.

32. A process for treating a gas stream comprising hydrogen sulfide and carbon dioxide, said process comprising:

(a) carrying out an acid gas absorption step on said gas stream, thereby generating an acid gas stream enriched in said hydrogen sulfide and said carbon dioxide compared with said gas stream, but containing less than about 4 vol % hydrogen sulfide;

(b) carrying out a membrane fractionation step, comprising:
(i) passing said acid gas stream across the feed side of a polymeric fractionation membrane having a feed side and a permeate side;
(ii) withdrawing from said feed side a residue stream containing less than about 2,000 ppm hydrogen sulfide;
(iii) withdrawing from said permeate side a permeate stream containing at least about 10 vol % hydrogen sulfide;

said membrane fractionation step being characterized in that said fractionation membrane exhibits a mixed gas selectivity for said hydrogen sulfide over said carbon dioxide of at least about 3, as measured with mixtures containing at least said hydrogen sulfide and said carbon dioxide and at a feed pressure of at least 200 psig;

(c) further treating said permeate stream in a sulfur-fixing step.

33. The process of claim 32, wherein said mixed gas selectivity is at least about 4.

34. The process of claim 32, wherein said mixed gas selectivity is at least about 5.

35. The process of claim 32, wherein said mixed gas selectivity is at least about 7.

* * * * *